(12) United States Patent
Kamitani et al.

(10) Patent No.: US 10,895,787 B2
(45) Date of Patent: Jan. 19, 2021

(54) LIQUID CRYSTAL PANEL

(71) Applicant: SHARP KABUSHIKI KAISHA, Sakai (JP)

(72) Inventors: Shingo Kamitani, Sakai (JP); Junichi Morinaga, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 22 days.

(21) Appl. No.: 16/248,348

(22) Filed: Jan. 15, 2019

(65) Prior Publication Data

US 2019/0227391 A1    Jul. 25, 2019

(30) Foreign Application Priority Data

Jan. 19, 2018   (JP) .................................. 2018-007210

(51) Int. Cl.
*G02F 1/1343* (2006.01)
*G02F 1/1335* (2006.01)
(Continued)

(52) U.S. Cl.
CPC ...... *G02F 1/134336* (2013.01); *G02F 1/1337* (2013.01); *G02F 1/1368* (2013.01); *G02F 1/13394* (2013.01); *G02F 1/133512* (2013.01); *G02F 1/136286* (2013.01); *G02F 2001/13396* (2013.01); *G02F 2001/134345* (2013.01); (Continued)

(58) Field of Classification Search
CPC ............ G02F 1/133512; G02F 1/1337; G02F 1/13394; G02F 1/134336; G02F 1/136286; G02F 1/1368; G02F 2001/13396; G02F 2001/134345; G02F 2201/121
See application file for complete search history.

(56) References Cited

U.S. PATENT DOCUMENTS 10,198,105 B2 *   2/2019  Shim ...................... G06F 3/044
2005/0185130 A1 *   8/2005  Oh ....................... G02F 1/13394
349/156

(Continued)

FOREIGN PATENT DOCUMENTS

JP    2004-239982 A    8/2004
JP    2010-152188 A    7/2010
(Continued)

*Primary Examiner* — Hoan C Nguyen
(74) *Attorney, Agent, or Firm* — ScienBiziP, P.C.

(57) ABSTRACT

A liquid crystal panel includes an array substrate, a counter substrate, and a liquid crystal layer therebetween. The counter substrate includes a sub-pixel in-between light blocking section extending in a grid and surrounding the sub pixels, a first projection projecting from the counter substrate toward the array substrate and having a projecting end that is contacted with a part of the array substrate to define a distance between the substrates, and second projections projecting from the counter substrate toward the array substrate and having projecting ends that are spaced from the array substrate. The first projection and the second projections overlap the sub-pixel in-between light blocking section. A distance between a center line of a width dimension of the sub-pixel in-between light blocking section and a center of each second projection is smaller than a distance between the center line and a center of the first projection.

12 Claims, 12 Drawing Sheets

(51) Int. Cl.
*G02F 1/1368* (2006.01)
*G02F 1/1362* (2006.01)
*G02F 1/1339* (2006.01)
*G02F 1/1337* (2006.01)

(52) U.S. Cl.
CPC ............ *G02F 2001/134372* (2013.01); *G02F 2201/121* (2013.01)

(56) References Cited

U.S. PATENT DOCUMENTS

| | | | |
|---|---|---|---|
| 2009/0289260 A1* | 11/2009 | Sonoda | G02F 1/133723 257/72 |
| 2010/0079712 A1* | 4/2010 | Tanaka | G02F 1/133512 349/123 |
| 2010/0103121 A1* | 4/2010 | Kim | G06F 3/0412 345/173 |
| 2010/0165278 A1 | 7/2010 | Matsumori et al. | |
| 2012/0081641 A1* | 4/2012 | Noh | G02F 1/13394 349/106 |
| 2015/0253620 A1* | 9/2015 | Yang | G02F 1/133512 349/106 |
| 2015/0285968 A1* | 10/2015 | Zha | G02F 1/133512 359/891 |
| 2017/0102576 A1 | 4/2017 | Yasukawa et al. | |
| 2017/0199411 A1* | 7/2017 | Kim | G02F 1/1333 |

FOREIGN PATENT DOCUMENTS

| | | |
|---|---|---|
| JP | 2017-037211 A | 2/2017 |
| JP | 2017-076010 A | 4/2017 |
| KR | 100687352 * | 2/2007 |

* cited by examiner

LIQUID CRYSTAL PANEL

CROSS REFERENCE TO RELATED APPLICATION

This application claims priority from Japanese Patent Application No. 2018-7210 filed on Jan. 19, 2018. The entire contents of the priority application are incorporated herein by reference.

TECHNICAL FIELD

The technology described herein relates to a liquid crystal panel.

BACKGROUND

A liquid crystal panel includes an array substrate and a counter substrate that are arranged opposite each other while having a predetermined distance therebetween, a liquid crystal layer enclosed between the substrates, and a column spacer (a projection) disposed on the counter substrate. The column spacer defines the distance between the substrates (hereinafter, referred to as a cell gap). The column spacers project from the counter substrate toward the array substrate and have projecting ends that are contacted with a part of the array substrate to keep the constant cell gap.

However, various kinds of films having various patterns are stacked on the inner surface of the array substrate (the surface opposite the liquid crystal layer) to form an uneven structure (a hole structure) thereon. Therefore, even if the projecting ends of the column spacers projecting from the counter substrate are designed to be contacted with a reference surface of the array substrate, the projected end may be slipped in a hole having a lower bottom surface than the reference surface and fit therein. It is inevitable that displacement is caused in bonding the substrates. The substrates are partially displaced from each other due to the deformation and warping of the substrates according to the application of the external pressure on the panel surface. If the projected ends of some of the column spacers are dropped in the hole of the array substrate, the cell gap is varied and uneven within a plane surface of the liquid crystal panel. Accordingly, the cell thickness is uneven and display quality is lowered.

There has been proposed an image display device including the column spacers that are formed on the counter substrate to sandwich the hole structure of the array substrate. According to such a configuration, even if the bonding of the substrates is displaced, the column spacers of a predetermined ratio or greater among all of the column spacers can effectively function as the spacers without being dropped in the holes. Such an image display device is described in Unexamined Japanese Patent Application Publication No. 2004-239982.

SUMMARY

The column spacers disposed on the counter substrate may include sub spacers in addition to the main spacers that define the cell gap. If an external force pressing the image display surface acts on the liquid crystal panel, the sub spacers receive the external force and protect the structure formed within the liquid crystal panel. Each of the sub spacers has a projecting dimension that is smaller than a projecting dimension (that is the cell gap) of the main spacer and has a projecting end such that a clearance is provided between the projecting end and the array substrate. According to such a configuration, a volume of the liquid crystal layer is less likely to be excessively decreased because of the sub spacers and the projecting ends of the sub spacers are less likely to damage the inner surface of the array substrate.

The main spacers and the sub spacers may cause disturbance of correct alignment of the liquid crystal molecules included in the liquid crystal layer. Therefore, it is preferable to arrange a light blocking layer (a black matrix layer, a BM layer), which blocks light, on the counter substrate so as to overlap the column spacers. It is preferable to arrange the column spacers to overlap the light blocking layer that is arranged in a matrix to surround the sub-pixel electrodes in a plan view of the liquid crystal panel so as to decrease an area of the light blocking layer in an entire area of the liquid crystal panel and obtain a high aperture ratio. The column spacers are arranged at intervals such that centers thereof are located on a center line of the sub-pixel in-between light blocking section. According to such a configuration, a part of or a whole of the spacer light blocking sections for blocking light at the column spacers is included in the sub-pixel in-between light blocking section and therefore, multiple column spacers can be arranged within a plane surface of the liquid crystal panel at a constant distribution while reducing an arrangement area of the light blocking layer.

However, in the sections of the array substrate overlapping the sub-pixel in-between light blocking section, signal lines and switching components that may disturb the alignment of the liquid crystal molecules are normally arranged. Furthermore, near the overlapping sections, an uneven structure may be provided for connection or repair of the lines. If the centers of the projecting ends of the main spacers are contacted with the vicinity of the uneven structure, the cell gap may not be maintained stably. However, if all the column spacers are shifted such that the centers of the projecting ends thereof are offset from the uneven hole structure, the spacer light blocking sections extend outside from the sub-pixel electrode in-between light blocking section and an area of the light blocking layer required for blocking light at the structure that may disturb the alignment of the liquid crystal molecules is increased and the aperture ratio of the liquid crystal panel is greatly lowered.

The technology described herein was made in view of the above circumstances. An object is to provide a liquid crystal panel that appropriately blocks light in a section of liquid crystal molecules whose alignment is to be disturbed while keeping a high aperture ratio and is less likely to cause uneven cell thickness within a panel plane surface and has good pressure force resistance property.

A liquid crystal panel according to the technology described herein includes an array substrate including sub-pixel electrodes that are arranged in a matrix and a counter substrate disposed opposite the array substrate while having a liquid crystal layer therebetween. The counter substrate includes a sub-pixel in-between light blocking section configured to block light and extending in a grid and surrounding the sub pixels in a plan view in a normal direction of the counter substrate, a first projection projecting from the counter substrate toward the array substrate and having a projecting end that is contacted with a part of the array substrate to define a distance between the counter substrate and the array substrate, and second projections projecting from the counter substrate toward the array substrate and having projecting ends that are spaced from the array substrate. The first projection and the second projections overlap the sub-pixel in-between light blocking section. A distance between a center line of a width dimension of the sub-pixel in-between light blocking section and a center of each of the second projections is smaller than a distance between the center line of the width dimension of the sub-pixel in-between light blocking section and a center of the first projection.

According to the above configuration, the first projection defines the distance between the array substrate and the counter substrate and the second projections protect the substrate internal structure from the external pressure force applied to the plate surfaces of the substrates. The projections may disturb the alignment of the liquid crystal molecules. However, the projections overlap the sub-pixel in-between light blocking section that is disposed around each of the sub pixel electrodes. According to such a configuration, a part or a whole of the projection light blocking section that blocks light at the projections is included in the sub-pixel in-between light blocking section. Therefore, the projections are disposed at a certain density while keeping the display quality without increasing the arrangement area of the light blocking layer within the surface area of the liquid crystal panel. The sub-pixel in-between light blocking section that is arranged in a grid to surround each of the sub-pixel electrodes clearly defines light rays whose transmission is switched between on and off according to driving of each sub-pixel electrode and improves contrast of a displayed image. The counter substrate includes the color portions that are arranged in a matrix to be opposed to the respective sub-pixel electrodes and configured to selectively transmit light of a specific color. The sub-pixel in-between light blocking section is disposed on the border between the color portions and prevents the colors from mixing and improves color contrast of a displayed image. The uneven structure formed on the array substrate may cause disturbance of alignment of the liquid crystal molecules. Therefore, such an uneven structure is preferably disposed to overlap the sub-pixel in-between light blocking section of the counter substrate not to increase the arrangement area of the light blocking layer in a whole liquid crystal panel.

The second projection has the light blocking width that is required for light blocking and is relatively small and is disposed such that the center thereof is close to the center line of the sub-pixel in-between light blocking section. Therefore, most part or a whole of the second projection light blocking section is included in the sub-pixel in-between light blocking section. The arrangement area of the light blocking layer including the sub-pixel in-between light blocking section and the projection light blocking section is reduced. The second projections are not configured to define the cell gap. Therefore, no problem occurs even if the array substrate has an uneven structure (a hole structure) in sections corresponding to the second projections.

The first projection that defines the cell gap has a large light blocking width required for light blocking. Therefore, even if the first projection is disposed such that the center thereof is close to the center line of the sub-pixel in-between light blocking section, for example, on the center line, at least a part of the first projection light blocking section projects from the sub-pixel in-between light blocking section. Shifting of such a first projection only results in that a different part of the first projection light blocking section projects from the sub-pixel in-between light blocking section and a projecting area is not largely changed. Further, the number of the first projection is relatively small and therefore, the arrangement area of the light blocking layer including the sub-pixel in-between light blocking section and the projection light blocking section is not required to be largely increased. By shifting the position of the first projection, the first projection is disposed such that the center of the projecting end thereof is contacted with the flat reference surface of the array substrate that is off from the uneven structure. Accordingly, the first projection is less likely to be dropped in or hit the recessed section of the array substrate and the cell gap is less likely to be uneven.

As described above, the position of the first projection with respect to the center line of the width of the sub-pixel in-between light blocking section is shifted from that of the second projection. Specifically, the distance between the center line of the sub-pixel in-between light blocking section and the center of the second projection is smaller than the distance between the center line of the sub-pixel in-between light blocking section and the center of the first projection. According to such a configuration, the cell thickness unevenness is less likely to be caused in a plane surface of the liquid crystal panel and the liquid crystal panel has a good pressure force resistance property. In such a liquid crystal panel, a high aperture ratio is maintained and light is appropriately blocked in a part of the liquid crystal molecules whose alignment is to be disturbed.

According to the technology described herein, a liquid crystal panel having good image display quality and a good pressure force resistance property is obtained.

DETAILED DESCRIPTION

First Embodiment

A first embodiment of the present technology will be described with reference to FIGS. 1 to 7.

Figure 5:
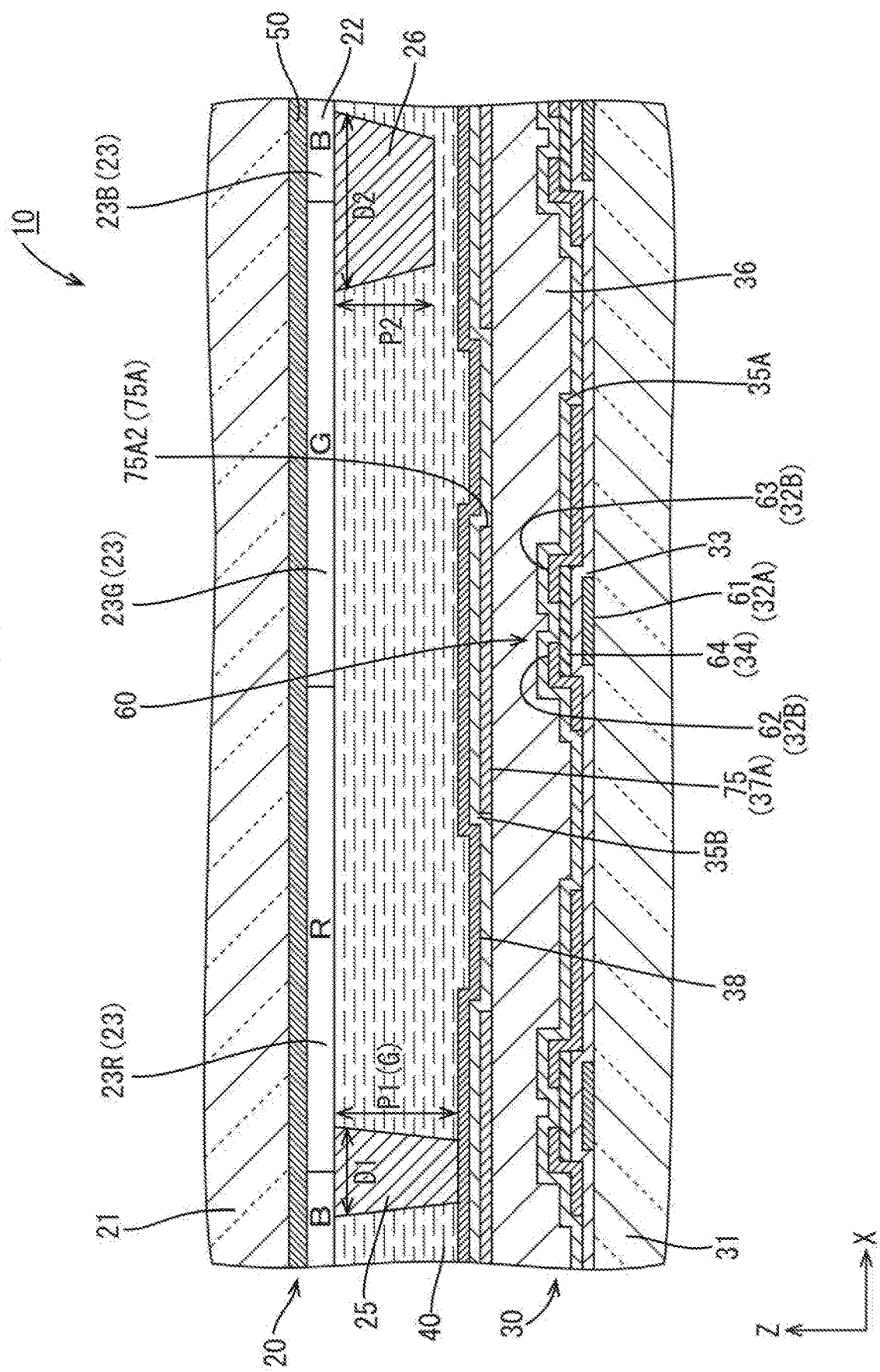
FIG. 5 is a cross-sectional view taken along line A-A in FIG. 4.
Figure 6:
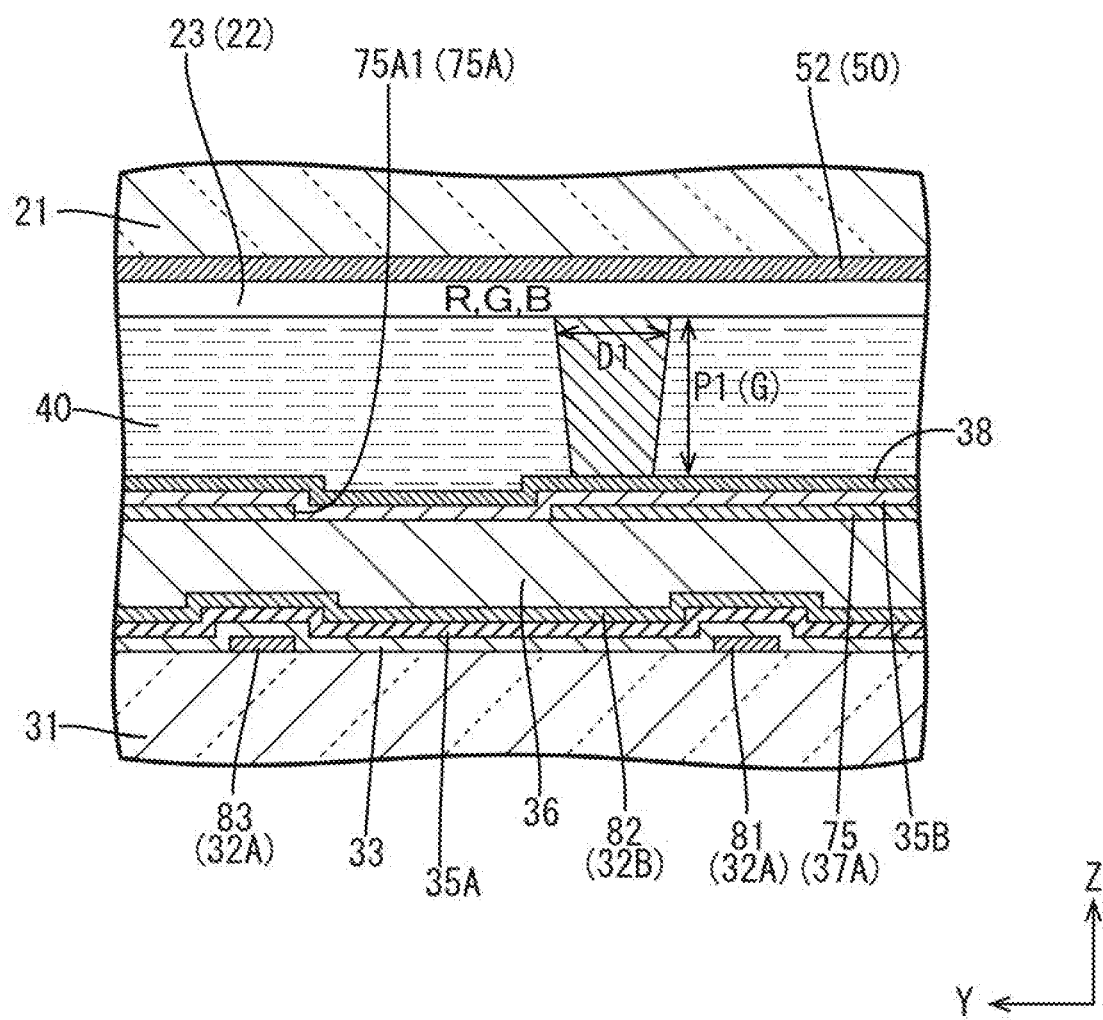
FIG. 6 is a cross-sectional view taken along line B-B in FIG. 4.
Figure 7:
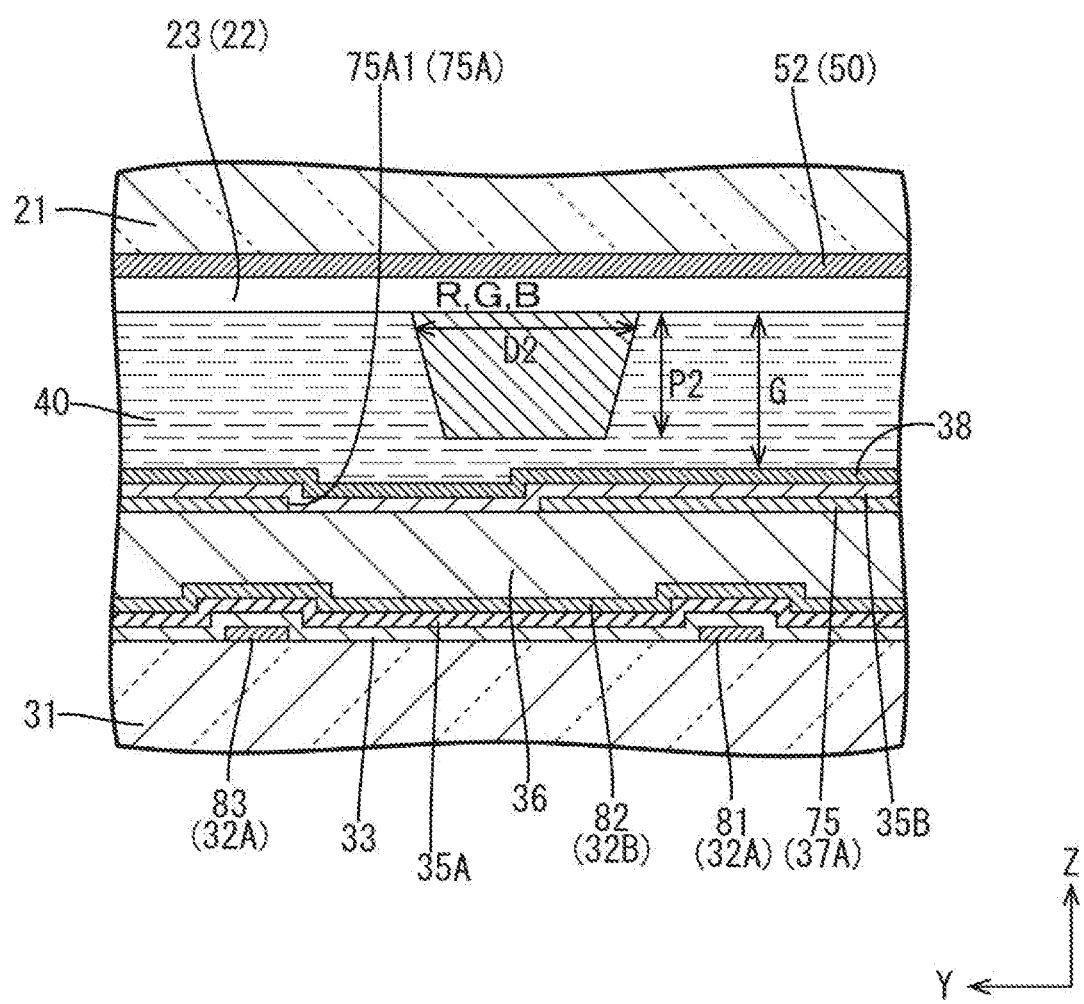
FIG. 7 is a cross-sectional view taken along line C-C in FIG. 4.

In the first embodiment, a liquid crystal panel 10 of a liquid crystal display device 1 will be described as an example. X-axis, Y-axis and Z-axis may be indicated in some of the drawings. The axes in each drawing correspond to the respective axes in other drawings. A numeral or a symbol is put on one of the same components and no numeral or symbol may be put on the rest of them. In the following description, an upper side and a lower side in FIGS. 5, 6, and 7 are a front side and a rear side, respectively.

The liquid crystal display device 1 according to the first embodiment may be used in various kinds of electronic devices such as mobile phones (including smartphones), notebook computers (including tablet computers), wearable terminals (including smart watches), handheld terminals (including electronic books and PDAs), portable video game players, and digital photo frames. The liquid crystal panel 10 is in a range between some inches to ten and some inches. Namely, the liquid crystal panel 10 is in a size that is classified as a small or a small-to-medium. However, the liquid crystal panel is not necessarily such a small-to-medium one but may have a screen size of several dozen inches or greater, which is classified as a large size (an extra-large size).

Figure 1:
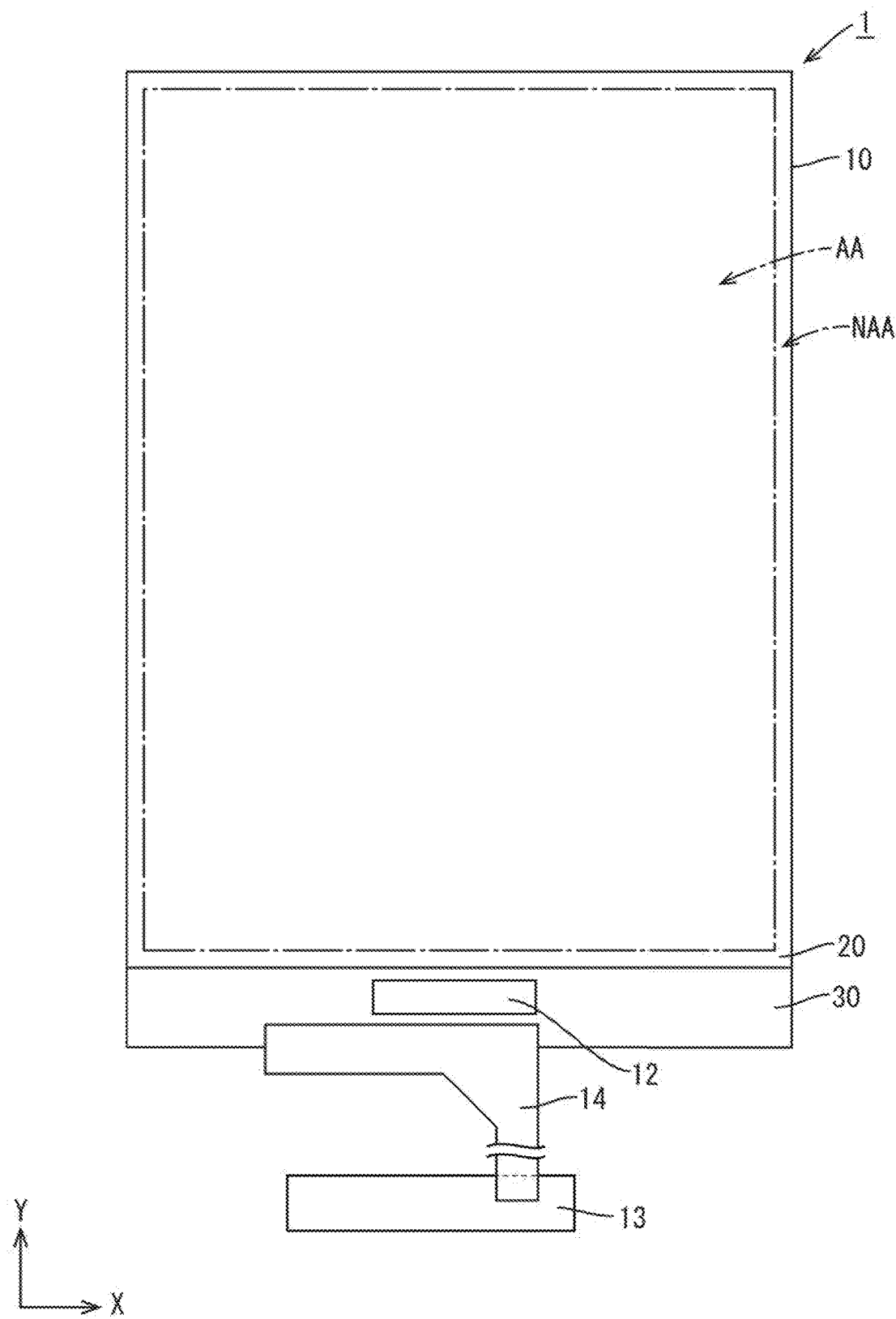
FIG. 1 is a general plan view illustrating a connection configuration near a liquid crystal panel of a liquid crystal display device according to a first embodiment.

As illustrated in FIG. 1, the liquid crystal display device 1 includes a liquid crystal panel 10, a driver (a panel driving section, a driving circuit) 12, a control circuit board (an external signal supply source) 13, a flexible board (an external connecting component) 13, and a backlight device. The liquid crystal panel 10 is configured to display images. The driver 12 is configured to drive the liquid crystal panel 10. The control circuit board 13 is configured to supply various kinds of input signals to the driver 12 from an external device. The flexible board 14 electrically connects the liquid crystal panel 10 and the control circuit board 13. The backlight device is an external light source that supplies light to the liquid crystal panel 10 for displaying images. The driver 12 and the flexible board 14 are mounted on the liquid crystal panel 10 while having an anisotropic conductive film (ACF) therebetween.

As illustrated in FIG. 1, the liquid crystal panel 10 has a vertically elongated quadrangular (rectangular) shape as a whole. The liquid crystal panel 10 includes a display area (an active area) AA in a middle section of a plate surface thereof and a non-display area (a non-active area) NAA on a peripheral section of the plate surface. Images are displayed in the display area AA. The non-display area NAA surrounds the display area AA and has a frame plan view shape, in the liquid crystal panel 10, a short-side direction matches the X-axis direction, a long-side direction matches the Y-axis direction, and a plate thickness direction matches the Z-axis direction in each drawing. In FIG. 1, an outline of the display area AA is illustrated with a dotted line and an area outside the dotted line is the non-display area NAA.

The liquid crystal panel 10 at least includes transparent substrates 21, 31 that are made from glass plates or resin plates having a heat-resistant property, an insulation property, and high transmissivity. Various kinds of films, which will be described later, are stacked on the transparent substrates 21, 31 with a certain pattern. One of the transparent substrates 21 and 31 on the front side is a CF substrate 20 (a counter substrate) and one on the back side (a rear surface side) is an array substrate 30 (a thin film transistor substrate, an active matrix substrate, a TFT substrate). As illustrated in FIG. 5, a predetermined cell gap G is present between the CF substrate 20 and the array substrate 30, which configure a pair of substrates and a liquid crystal layer 40 is enclosed in the cell gap G. The liquid crystal layer 40 includes liquid crystal molecules that are substances with optical characteristics that vary according to application of an electric field. In the first embodiment, the liquid crystal panel 10 is operated in a fringe field switching (FFS) mode. Polarizing plates are bonded to outer surfaces of the transparent substrates 21 and 31, respectively.

Figure 2:
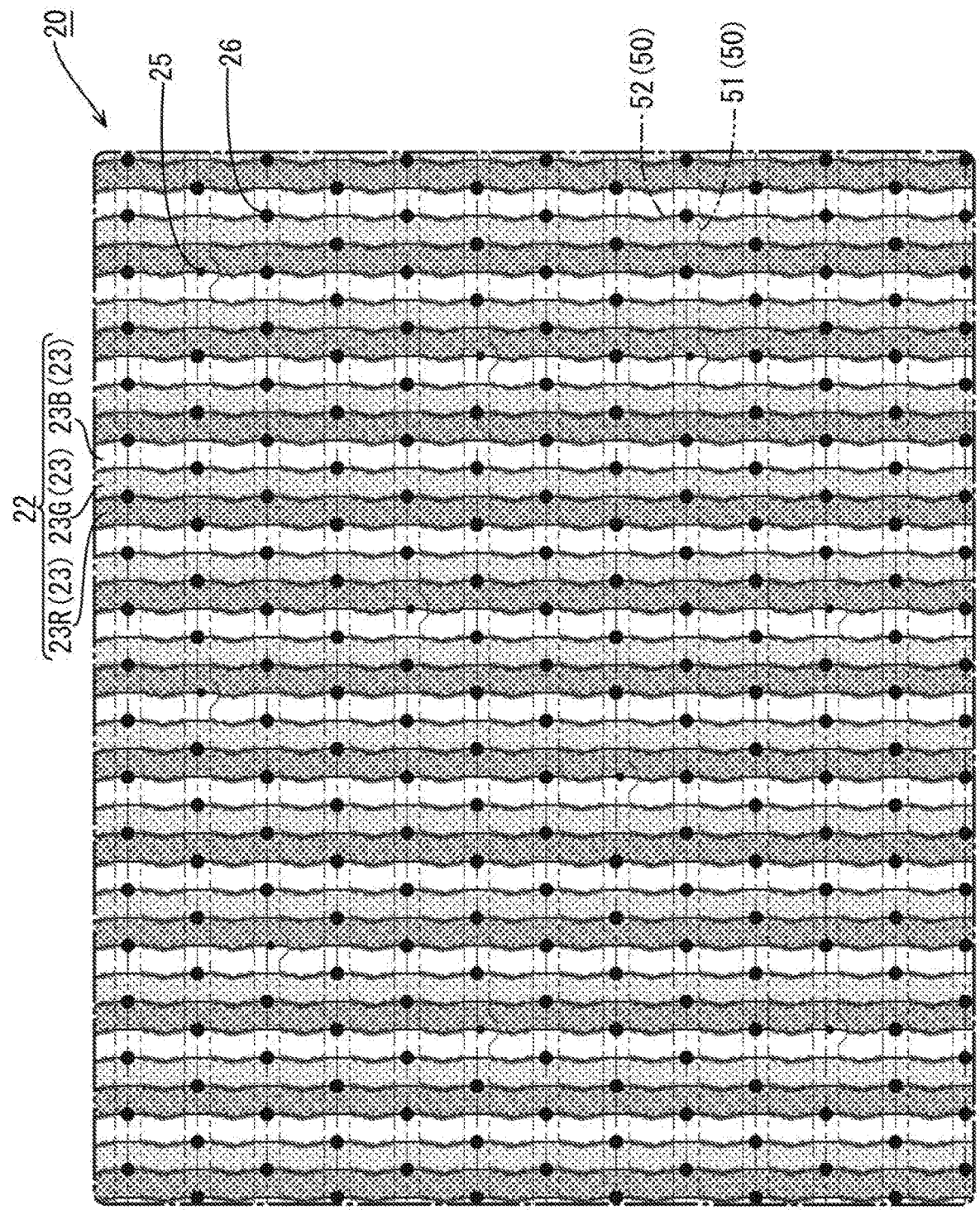
FIG. 2 is a general plan view illustrating arrangement of color filters, main spacers, and sub spacers in a display area of a CF substrate included in a liquid crystal cell.

FIG. 2 illustrates a general schematic plan view illustrating arrangement of a color filter 22, main spacers 25, and sub spacers 26. The color filter 22 is arranged in the display area AA of the CF substrate 20. The main spacers 25 and the sub spacers 26 are arranged on the rear surface side (an inner side, a liquid crystal layer 40 side) of the color filter 22. The CF substrate 20 includes sub-pixel in-between light blocking section 50 (a part of a light blocking layer) on a front side of the color filter 22 (on an outer side, a transparent substrate 21 side) and includes an overcoat layer on a rear side of the color filter 22. The sub-pixel in-between light blocking section 50 is disposed in a predetermined pattern. An alignment film is disposed on the CF substrate 20 closest to the rear side to be contacted with the liquid crystal layer 40.

As illustrated in FIG. 2, the color filter 22 includes color portions 23 that are arranged in a matrix. The color portions 23 are arranged opposite respective sub-pixel electrodes 70 arranged on the array substrate 30 and a set of the color portion 23 and the sub-pixel electrode 70 that are opposite each other configures a sub pixel. Each color portion 23 contains pigment of a color that is exhibited by the color portion 23 and non-exhibited colors are absorbed by the pigment so as to selectively transmit the color to be exhibited (light of a specific color). The color filter 22 of this embodiment includes the color portions of three colors including a red color portion 23R exhibiting red, a green color portion 23G exhibiting green, and a blue color portion 23B exhibiting blue. A set of one red sub pixel, a green sub pixel, and a blue sub pixel configures a pixel.

Each color portion 23 has a vertically elongated rectangular (quadrangular) shape and areas of the color portions of the respective colors are same. In other words, an area ratio of the color portions 23 of each color within the display area is same and an aperture ratio of each sub pixel is same. The color portions 23 that exhibit different colors are arranged next to each other in the X-axis direction alternately and repeatedly. The color portions 23 that exhibit a same color are arranged in the Y-axis direction. In other words, each of the color portions 23 extends in a zig-zag way over an entire length of the display area in the Y-axis direction similar to source lines (signal lines) 32 and the sub-pixel electrodes 70 on the array substrate 30 and extends over (crosses) all of the sub-pixel electrodes 70 that are arranged in the Y-axis direction on the array substrate 30.

The CF substrate 20 includes the sub-pixel in-between light blocking section 50 that is arranged in a grid between the color filter 22 and the transparent substrate 21. The sub-pixel in-between light blocking section 50 includes a TFT light blocking section 51 (a switching component light blocking section) and a source line light blocking section 52 (a signal line light blocking section). The TFT light blocking section 51 extends along gate lines 81 included in the array substrate 30 and in the X-axis direction and blocks light at the TFTs 60 (examples of the thin film transistors, the switching components). The source line light blocking section 52 extends in a zig-zag way substantially in the Y-axis direction while overlapping the source lines 82. The TFT light blocking section 51 is arranged at a border between the sub pixels that are adjacent to each other in the Y-axis direction and the source line light blocking section 52 is arranged at a border between the sub pixels that are adjacent to each other in the X-axis direction, that is, a border between the color portions 23. The sub-pixel in-between light blocking section 50 clearly defines light rays whose transmission is switched between on and off according to driving of each sub-pixel electrode 70 and prevents colors from being mixed to improve contrast of a displayed image.

The CF substrate 20 includes main spacers 25 (first projections) and sub spacers 26 (second projections) on a rear surface side of the color filter 22 such that the main spacers 25 and the sub spacers 26 are dispersedly disposed over an entire area of the rear surface at a substantially constant distribution. A spacer light blocking section 55 (a part of the light blocking section) is disposed around each of the main spacers 25 and the sub spacers 26 to block light in portions around the main spacers 25 and the sub spacers 26.

Arrangement of light blocking layers such as the sub-pixel in-between light blocking section 50 including the source line light blocking sections 52 and the TFT light blocking sections 51 will be described in detail later. Dimensions, shapes, and arrangement of the main spacers 25, the sub spacers 26, and the spacer light blocking section 55 will be described in detail later.

On the inner surface side (the liquid crystal layer side, on a surface side opposite the CF substrate 20) of the array substrate 30, the TFTs 60, which are switching components, and sub-pixel electrodes 70 are arranged in a matrix (columns and rows) in the display area AA. Gate lines (scanning lines) 81 and source lines (signal lines, data lines) 82 are routed in a matrix to surround each pair of the TFT 60 and the sub-pixel electrode 70. Each pair of the TFT 60 and the sub-pixel electrode 70 is disposed at each of intersections of the gate lines 81 and the source lines 82 that are arranged in a grid in a plan view. The gate lines 31 extend substantially straight along the X-axis direction and the source lines 82 extend in a zig-zag way substantially along the Y-axis direction.

Figure 4:
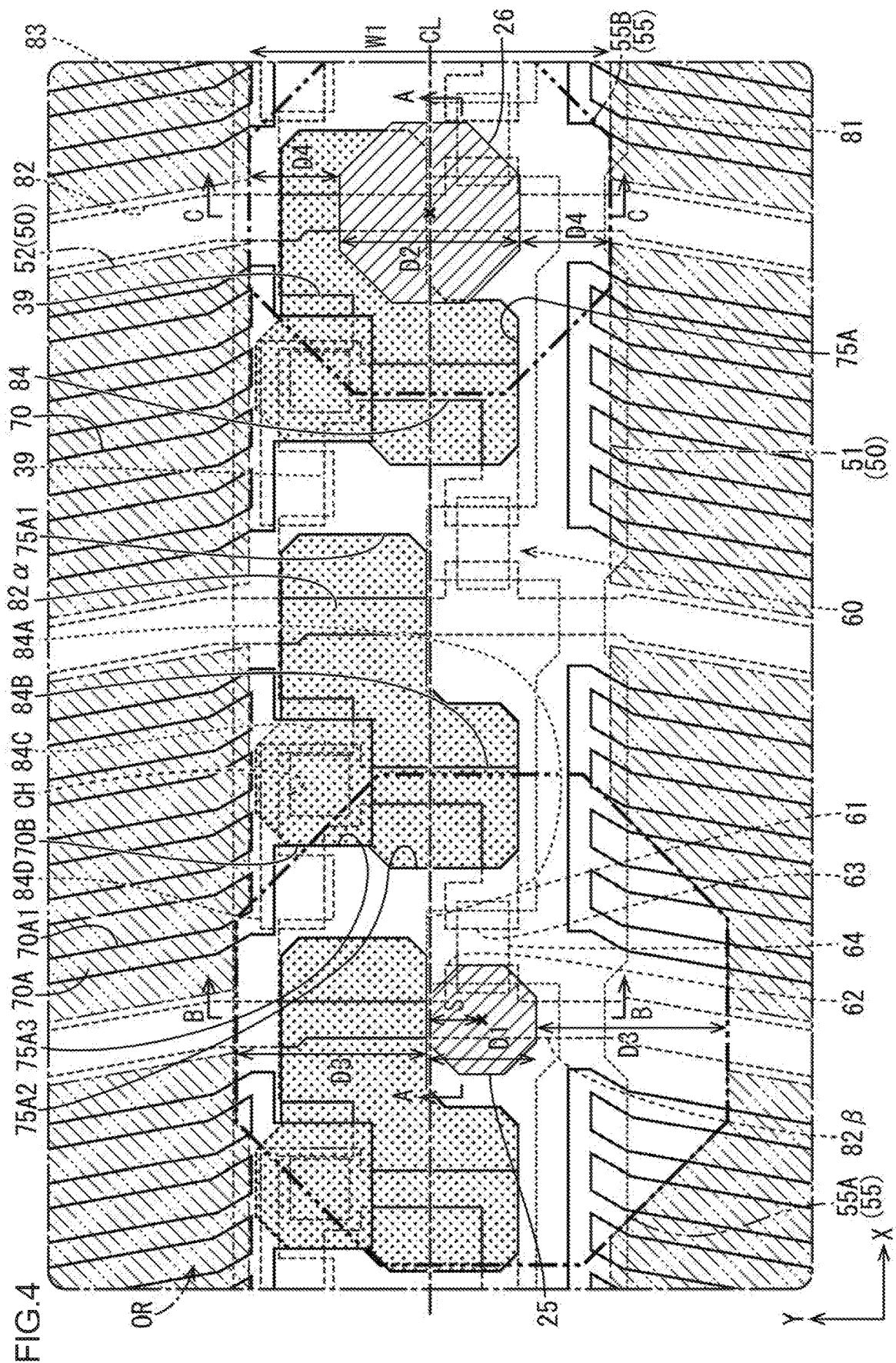
FIG. 4 is an enlarged view illustrating a part of FIG. 3 near light blocking sections such as TFTs.

As illustrated in FIG. 4, the TFT 60 includes a gate electrode 61 connected to the gate line 81, a source electrode 62 connected to the source line 82, a drain electrode 63 connected to the sub-pixel electrode 70 through a drain line 84, and a channel section 64 connected to the source electrode 62 and the drain electrode 63. According to such a configuration, the source electrode 62 is opposite the drain electrode 63 on a semiconductor film with a certain distance therebetween while sandwiching the channel section 64. The source electrode 62 and the drain electrode 63 are electrically connected to the semiconductor film such that electrons move between the source electrode 62 and the drain electrode 63.

The TFT 60 is driven based on the scanning signal supplied through the gate line 81. Then, the potential relating the image signal that is supplied to the source line 82 is supplied to the drain electrode 63 through the channel section 64 such that the sub-pixel electrode 70 is charged at the potential relating the image signal. The source lines 82 extends over the entire length of the display area AA in the Y-axis direction and two ends of the source lines 82 are disposed on the non-display area NAA. Auxiliary lines routed to the non-display area NAA overlaps the ends of the source lines 82 while having a gate insulation film 33 therebetween. If any problems such as disconnection or short-circuit occur in the source line 82, the source line 82 is cut to short-circuit the end of the source line 82 and the auxiliary line such that the image signal can be supplied via the auxiliary line to each of the TFTs 60 connected to the source line 82 that is to be repaired.

The drain line (sub-pixel electrode connection line) 84 includes a first line section 84A, a second line section 84B, and an electrode connecting section 84C. The first line section 84A extends from the drain electrode 63 in the X-axis direction toward an opposite side from the source electrode 62 side (toward the right side in FIG. 4). The second line section 84B extends from the first line section 84A and is bent to extend in the Y-axis direction toward the sub-pixel electrode 70 (upward in FIG. 4). The electrode connecting section 84C is an extended distal end portion of the second line section 84B and connected to the sub-pixel electrode 70. The drain line 84 further includes a third line section 84D that is bent at the electrode connecting section 84C of the second line section 84B and extends in the X-axis direction toward the source line 82 (to the left side in FIG. 4) that is to be connected to the TFT 60. Thus, the drain line 84 has a folded plan view shape as a whole. The sub-pixel electrode 70 that is to be connected to the drain line 84 includes an electrode body 70A and a drain line connecting section (a connecting section) 70B. The electrode body 70A includes slits 70A1. The drain line connecting section 70B projects from the electrode body 70A toward the TFT 60 in the Y-axis direction and is connected to the drain line 84. In the following description and FIG. 4, out of the pair of source lines 82 sandwiching the sub-pixel electrode 70, a first source line 82α is on a right side of the sub-pixel electrode 70 and a second source line 82β is on a left side of the sub-pixel electrode 70. The source electrode 62 is disposed on the source line that is on the left side of the TFT 60. Namely, out of the pair of source lines 82 sandwiching the sub-pixel electrode 70, the second source line 82β is to be connected to the sub-pixel electrode 70 and the first source line 82α is not to be connected to the sub-pixel electrode 70. The first source line 82α is to be connected to the sub-pixel electrode 70 that is disposed on a right side of the above sub-pixel electrode 70.

Figure 3:
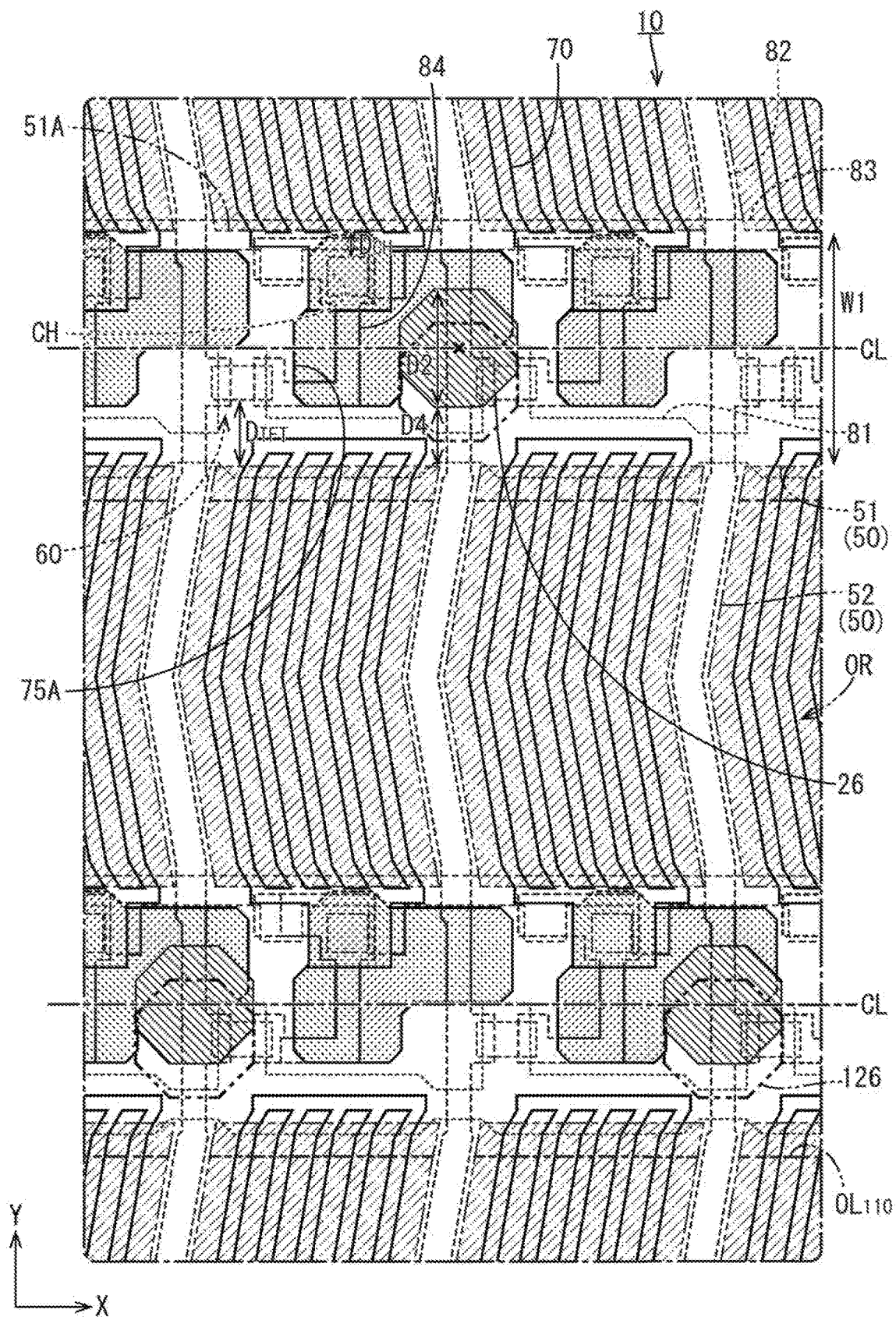
FIG. 3 is a general schematic view illustrating a planar configuration and an aperture region in the display area of on array substrate on which the main spacers and the sub spacers are disposed.

As illustrated in FIG. 3, the sub-pixel electrode 70 is arranged in a substantially vertically-elongated quadrangular area that is surrounded by a pair of gate lines 81 and a pair of source lines 82. The long-side sections are formed in a zig-zag shape along the source lines 82. The sub-pixel electrode 70 includes the slits 70A1, which are through holes, extending along the long side thereof. In the first embodiment, four slits 70A1 are formed. The array substrate 30 includes a common electrode 75 on an inner surface thereof in the display area AA and the common electrode 75 is disposed in a solid pattern while overlapping the sub-pixel electrode 70. If predetermined potential difference is created between the sub-pixel electrode 70 and the common electrode 75 that are overlapped with each other, a fringe field (an oblique field) including a component in a direction normal to a plate surface of the array substrate 30 is applied to the sections near the slits 70A1 in addition to a component in a direction along the plate surface of the array substrate 30.

A capacitor line 83 is arranged between the pair of gate lines 81 sandwiching the sub-pixel electrode 70 with respect to the Y-axis direction. The capacitor line 83 extends parallel to the gate line 81 and crosses the sub-pixel electrodes 70 and the source lines 82. The capacitor lines 83 are included in a different layer from the sub-pixel electrodes 70 and the source lines 82. The capacitor line 83 overlaps the third line section 84D of the drain line 84 connected to the sub-pixel electrode 70 and an electrostatic capacitance is created between the capacitor line 83 and the sub-pixel electrode 70. The potential charged in the sub-pixel electrode 70 according to the driving of the TFT 60 can be held by the capacitor line 83 for a certain period. The capacitor lines 83 are included in the same layer as the gate lines 81. The capacitor lines 83 are preferably charged at a potential same as that of the common electrode 75. However, it is not limited thereto.

In the first embodiment, a drain line overlapping section 39 overlapping the third line section 84D of the drain line 84 is formed continuously from the capacitor line 83. The drain line overlapping section 39 is to be provided with laser light to darken the pixel that is to be brightened. The drain line overlapping section 39 is arranged between the source line 82 and the drain line connecting section 70B of the sub-pixel electrode 70 to block an electric filed between the source line 82 and the drain line connecting section 70B. Accordingly, display quality is less likely to be deteriorated due to a parasitic capacitance that is caused by the electric filed.

Next, the various kinds of films formed in layers on the inner surface side of the array substrate 30 will be described. As illustrated in FIG. 5, on the array substrate 30, a first metal film (a gate metal film) 32A, a gate insulation film 33, a semiconductor film 34, a second metal film (a source metal film) 32B, a first interlayer insulation film 35A, a planarization film 36, a first transparent electrode film 37, a second interlayer insulation film 35B, a second transparent electrode film, and an alignment film 38 are formed in layers sequentially from the transparent substrate 31 side. The films are formed with the known photolithography method.

The first metal film 32A is a multilayered film including different kinds of metal materials or a single layer film including one kind of metal material. As illustrated in FIG. 5, the first metal film 32A forms the gate electrodes 61 of the TFTs 60, the gate lines, the capacitor lines 83 including the drain line overlapping sections 39, and the auxiliary lines. The gate insulation film 33 is formed of inorganic insulation material (inorganic material) such as $SiN_x$ and $SiO_2$. The semiconductor film 34 is a thin film including oxide semiconductors and configures the channel section 64 of the TFT 60. The second metal film 32B is a multilayered film or a single layer film similar to the first metal film 32A and configures the source electrodes 62 and the drain electrode 63 of the TFT 60, the source lines 82, and the drain lines 84. The first interlayer insulation film 35A is formed of inorganic insulation material similar to the gate insulation film 33. The planarization film 36 is formed of organic insulation material (organic material) such as polymethyl methacrylate (PMMA, acrylic resin). The planarization film 36 has a film thickness greater than that of other insulation films 33, 35A, 35B that are made of inorganic resin material. The inner surface of the array substrate 30 is formed in a plane surface by the planarization film 36. The first transparent electrode film 37A is made of transparent electrode material such as indium tin oxide (ITO) and forms the common electrode 75. The second interlayer insulation film 35B is made of inorganic insulation material similarly to the gate insulation film 33. The second transparent electrode film is made of transparent electrode material similarly to the first transparent electrode film 37A and forms the sub-pixel electrodes 70. The alignment film 38 is made of polyimide and included in a most inner layer side in the array substrate 30 (closest to the liquid crystal layer). The alignment film 38 is configured to align the liquid crystal molecules in the liquid crystal layer 40 in a predetermined direction. The liquid crystal layer 40 is enclosed between the substrates 20, 30 to be contacted with the alignment film 38. The alignment film 38 may be subjected to an alignment treatment such as rubbing if necessary.

As illustrated in FIG. 4, a contact hole CH is formed through the first interlayer insulation film 35A, the planarization film 36, and the second interlayer insulation film 35B. The sub-pixel electrode 70 formed from the second transparent electrode film is connected to the drain line 84 formed from the second metal film 32B through the contact hole CH. The contact hole CH overlaps the drain line connecting section 70B of the sub-pixel electrode 70 and the electrode connecting section 84C of the drain line 84 in a plan view. The first interlayer insulation film 35A, the planarization film 36, and the second interlayer insulation film 35B are disposed in a solid pattern over an entire area of at least the display area AA except for the contact holes CH.

As illustrated in FIG. 4, the common electrode 75 has a hole 75A that extends at least from the source line 82 to the drain line connecting section 70B of the sub-pixel electrode 70. In FIGS. 3 and 4, the area where the hole 75A is formed is illustrated with shading. The hole 75A of the first embodiment extends in an area ranging over the source line 82, the drain line connecting section 70B of the sub-pixel electrode 70, and also the drain line 84. Specifically, as illustrated in FIG. 4, the hole 75A includes a first hole section 75A1, a second hole section 75A2, and a third hole section 75A3 that are communicated with each other. The first hole section 75A1 overlaps the first source line 82α and extends laterally in both sides in the X-axis direction with respect to the first source line 82α. The second hole section 75A2 overlaps the drain line 84 and extends laterally in both sides in the X-axis direction with respect to the drain line 84. The third hole section 75A3 overlaps the drain line connecting section 70B, the electrode connecting section 84C, and the contact hole CH. The third hole section 75A3 is formed to prevent short circuit between the drain line connecting section 70B of the sub-pixel electrode 70 and the common electrode 75 while the drain line connecting portion 70B included in an upper layer than the common electrode 75 being passing through the contact hole CH to reach the electrode connecting section 84C of the drain line 84 that is included in a lower layer than the common electrode 75. The first hole section 75A1 and the second hole section 75A2 are formed to prevent short circuit between the common electrode 75 and each of the source lines 82 and the drain lines 84 if the source line 82 or the drain line 84 is irradiated with laser light for repairing.

Specifically, if short circuit is caused between the first source line 82α and the gate line 81, the first source line 82α is irradiated with laser light through the first hole section 75A1 to cut the first source line 82α and connect the first source line 82α to the auxiliary line. According to such repair, image signals can be supplied through the auxiliary line to each of the TFTs 60 connected to the first source line 82α. The first hole section 75A1 extends over the first source line 82α and laterally in both sides with respect to the first source line 82α. According to such a configuration, the short circuit is less likely to be caused between the common electrode 75 and the section of the first source line 82α that is irradiated with laser light. If short circuit is caused between the gate line 81 and the drain line 84 or between the gate electrode 61 and the drain electrode 63 or resistance at the time of the TFT 60 being off is lowered, such problems are solved as follows. The second line section 84B of the drain line 84 is irradiated with laser light through the second hole section 75A2 to cut the second line section 84B, and the overlapping section of the drain line overlapping section 39 that is continuous to the capacitance line 83 and the third line section 84D of the drain line 84 is irradiated with laser light to connect them so as to short circuit the capacitance line 83 and the sub-pixel electrode 70. According to such repair, the sub pixel that is to be brightened by the short circuit between the gate line 81 (the gate electrode 61) and the drain line 84 (the drain electrode 63) can be darkened. The second hole section 75A2 extends over the drain line 84 and laterally in the both sides with respect to the drain line 84 and therefore, the short circuit is less likely to be caused between the common electrode 75 and the section of the drain line 84 that is irradiated with laser light.

Configurations for maintaining the display quality of the liquid crystal panel 10 and keeping the constant cell gap G stably will be described in detail.

First, the arrangement of sub-pixel in-between light blocking section 50 will be described. As illustrated in FIG. 2, the CF substrate 20 includes the sub-pixel in-between light blocking section 50 between the color filter 22 and the transparent substrate 21. The sub-pixel in-between light blocking section 50 is formed in a grid in a plan view. The sub-pixel in-between light blocking section 50 includes the TFT light blocking sections 51 and the source line light blocking sections 52. In FIGS. 3 and 4, an open area OR having no light blocking layer above the structures formed on the inner surface side (the liquid crystal layer side) of the array substrate 30 is illustrated with different shading from that of the hole 75A. The sub-pixel in-between light blocking section 50 prevents the sub pixels of different colors from mixing and increases contrast of the display image and also blocks light in the uneven section (the hole structure) formed on the inner surface of the array substrate 30. The uneven section may cause alignment disturbance of the liquid crystal molecules. Thus, the sub-pixel in-between light blocking section 50 maintains image display quality.

As illustrated in FIGS. 3 and 4, the source line light blocking section 52 extending in the Y-axis direction has a width dimension that is slightly greater than that of the source line 82 that may cause alignment disturbance of the liquid crystal molecules. The source line light blocking section 52 just overlaps the source line 82. The TFT light blocking section 51 extending in the X-axis direction is connected to the spacer light blocking sections 55 such that a part of or whole of each spacer light blocking section 55 is within the TFT light blocking section 51. Namely, the light blocking layer extending in the X-axis direction is disposed in an area of the TFT light blocking section 51 and the spacer light blocking sections 55.

The TFT light blocking section 51 overlaps the gate line 81 and a part of the capacitance line 83 and covers an entire area between the lines 81 and 33. The TFT light blocking section 51 is disposed to overlap the uneven structure included in the area between the lines 81 and 83, specifically, the TFT 60, the contact hole CH, and the hole 75A for line repair. As illustrated in FIG. 3, the TFT light blocking section 51 is defined by an outer edge on the capacitance line 83 side and an outer edge on the gate line 81 side. The outer edge on the capacitance line 83 side is defined by a light blocking width $D_{CH}$ that is required for blocking light at the contact hole CH and the outer edge on the gate line 81 side is defined by a light blocking width $D_{TFT}$ that is required for blocking light at the TFT 60. The TFT light blocking section 51 has a relatively large width W1. The spacer light blocking section 55 will be described later.

Next, a size and a shape of the main spacer 25 and the sub spacer 26 will be described. As illustrated in FIG. 2, the CF substrate 20 includes the spacers 25 and the sub spacers 26 projecting from the rear surface (the liquid crystal layer 40 side) of the color filter 22 toward the array substrate 30.

As illustrated in FIGS. 5 and 6, the main spacer 25 includes a projecting end thereof that is contacted with a part of the array substrate 30 to keep the uniform cell gap G between the substrates 20 and 30. The main spacer 25 has a projecting dimension P1 that is substantially equal to the cell gap G. The main spacer 25 is actually to be compressed slightly by the load applied thereto in bonding the array substrate 30 and the CF substrate 20. Therefore, the projecting dimension of the main spacer 25 is preferably determined with considering a compression amount α in forming the main spacer 25. As illustrated in FIGS. 5 and 7, the sub spacer 26 has a projecting dimension P2 that is smaller than the projecting dimension P1 (that is the cell gap G) of the main spacer 25. The sub spacer 26 is opposite the inner surface of the array substrate 30 with a clearance therebetween. If external force of pressing the image display surface acts on the liquid crystal panel 10, the sub spacers 26 are configured to receive the pressure force and protect the structure within the liquid crystal panel 10. The sub spacers 26 are configured not to be contacted with the array substrate 30 such that the volume of the liquid crystal layer 40 is less likely to be excessively decreased due to the presence of the sub spacers 26 and the inner surface of the array substrate 30 is less likely to be damaged by the projecting ends of the sub spacers 26. In the first embodiment, the projecting dimension of the main spacer 25 is 3.2 μm and the projecting dimension of the sub spacer 26 is 2.6 μm. The main spacer 25 is compressed by 0.2 μm due to the load applied thereto in bonding the array substrate 30 and the CF substrate 20 and the cell gap G is 3.0 μm.

A cross-sectional shape of the main spacer 25 and the sub spacer 26 is not particularly limited. An arrangement area of the main spacer 25 and the sub spacer 26 is preferably determined while considering a balance of the function of each spacer 25, 26 and a light blocking width D3, D4 required for each spacer 25, 26 to block light. The light blocking width D3 of the main spacer light blocking section 55A that blocks light at the main spacer 25 is necessarily large. Therefore, it is not preferable to excessively increase the arrangement area of the main spacer 25 to keep the high aperture ratio. The light blocking width D4 of the sub spacer light blocking section 55B that blocks light at the sub spacer 26 can be small. Therefore, the arrangement area of the sub spacer 26 is preferably large to surely receive the pressure force. The arrangement area of each sub spacer 26 is preferably larger than the arrangement area of each main spacer 25. As illustrated in FIG. 4, in the first embodiment, the main spacers 25 and the sub spacers 26 have a columnar shape tapered toward the array substrate 30 and having a substantially regular octagonal cross-sectional shape. Each of the main spacer 25 and the sub spacer 26 is disposed symmetrically with respect to a line parallel to a center line CL of the TFT light blocking section 51 and passing through a center of the arrangement area thereof.

Next, the arrangement of the main spacers 25 and the sub spacers 26 in the liquid crystal panel 10 will be described. As illustrated in FIG. 2, in the first embodiment, the main spacers 25 and the sub spacers 26 are disposed at the respective cross points of the sub-pixel in-between light blocking section 50 that is arranged in a grid. Specifically, the main spacer 25 or the sub spacer 26 is disposed on every other cross point of the TFT light blocking sections 51 and the source line light blocking sections 52 with respect to the X-axis direction and the Y-axis direction. Namely, one main spacer 25 or one sub spacer 26 is provided for two sub pixels. The density distribution of the main spacers 25 and the sub spacers 26 is not particularly limited but may be altered appropriately according to an object. For example, one main spacer 25 or one sub spacer 26 may be provided for one sub pixel or three sub pixels. The main spacers 25 are preferably arranged dispersedly over an entire area of the liquid crystal panel 10 evenly to keep a constant cell gap G of the liquid crystal panel 10 and restrict occurrence of uneven cell thickness. The sub spacers 26 are arranged at a certain density over an entire area of the liquid crystal panel 10 to receive pressure force that is to be applied to an arbitrary part of the liquid crystal panel 10. The number of the sub spacers 26 is greater than that of the main spacers 25. In the first embodiment, the liquid crystal panel 10 includes ten main spacers 10 and 202 sub spacers 26 for 144 pixels or 432 sub pixels. The arrangement ratio of the main spacers 25 and the sub spacers 26 may be altered as appropriate according to an object.

As illustrated in FIG. 4, the main spacer 25 is formed such that a center thereof is positioned lower than the center line CL of the TFT light blocking section 51 by a predetermined shift amount S. As described before, the array substrate 30 includes the common electrode 75 having the hole 75A and therefore, the array substrate 30 has a recessed part or a hole on the inner surface thereof in a section overlapping the TFT light blocking section 51. If the main spacer 25 is formed such that the projecting end thereof is contacted with a surrounding section or an edge of the hole 75A, the projecting end may be slipped into and dropped in the recessed part.

The sub spacer 26 is formed such that a center thereof is positioned on the center line CL of the TFT light blocking section 51. The sub spacers 26 are not supposed to be contacted with the array substrate 30. Therefore, even if the sub spacer 26 overlaps the hole 75A in a plan view, the cell gap G can be kept stably.

Next, the spacer light blocking sections 55 that block light in portions having the main spacers 25 and the sub spacers 26 will be described. As illustrated in FIG. 4, the main spacer 25 and the sub spacer 26 project from the CF substrate 20 within the liquid crystal layer 40. Therefore, the spacers 25, 26 may disturb correct alignment of the liquid crystal molecules included in the liquid crystal layer 40. As illustrated with bold two dot dashed lines in FIG. 4, the spacer light blocking sections 55 are arranged to block light in the portions having the spacers 25, 26 such that a bright portion is less likely to be displayed on the black display screen and good display quality of the liquid crystal panel can be kept. The spacer light blocking sections 55 includes a main spacer light blocking section 55A (a first projection light blocking section) and a sub spacer light blocking section 55B (a second projection light blocking section). The main spacer light blocking section 55A blocks light in the portion having the main spacer 25 and the sub spacer light blocking section 55B blocks light in the portion having the sub spacer 26. Particularly, the main spacer 25 has the projecting dimension P1 that is greater than that of the sub spacer 26 and the projecting end thereof is directly contacted with the inner surface of the array substrate 30 to keep the cell gap G. Therefore, if the liquid crystal panel 10 receives external pressure and is warped, the alignment film 38 included in the array substrate 30 and is closest to the liquid crystal layer 40 may be rubbed with the projecting end of the main spacer 25 and a part of the alignment film 38 may be removed, and light may leak therefrom. The light blocking width of the main spacer light blocking section 55A is preferably greater than the light blocking width of the sub spacer light blocking section 55B.

As illustrated in FIG. 4, in the first embodiment, the light blocking width D3 of the main spacer light blocking section 55A that is arranged around the main spacer 25 is greater than the light blocking width D4 of the sub spacer light blocking section 55B. For example, the light blocking width D3 is twice as the light blocking width D4 or greater.

In the first embodiment, the main spacer 25 is arranged such that a width D1 (an area width for arranging the main spacer 25) of the main spacer 25 is defined in relation to a width W1 of the TFT light blocking section 51 and the light blocking width D3 around the main spacer 25 to satisfy the formula of D3>(W1−D1)/2. If the main spacer 25 is arranged such that the center thereof is positioned on the center line CL, a part of the main spacer light blocking section 55A projects from the TFT light blocking section 51. Since the main spacer 25 is arranged such that the center thereof is lower than the center line CL, the main spacer light blocking section 55A projects downwardly from the TFT light blocking section 51 by a greater amount than upwardly from the TFT light blocking section 51.

The sub spacer 26 is arranged such that a width D2 (an area width for arranging the sub spacer 26) of the sub spacer 26 is defined in relation to the width W1 of the TFT light blocking section 51 and the light blocking width D4 around the sub spacer 26 to satisfy the formula of D4≤(W1−D2)/2. Since the sub spacer 26 is arranged such that the center thereof is positioned on the center line CL of the TFT light blocking section 51, the whole sub spacer light blocking section 55B is included in the TFT light blocking section 51. Therefore, the light blocking width D4 is set to satisfy the formula of D4=(W1−D2)/2. According to such a structure, the area of the sub spacer 26 can be greatest within the range such that the whole sub spacer light blocking section 55B is included within the TFT light blocking section 51, and it is preferable for improving a pressure force resistance property.

Comparative Experiment 1

Figure 8:
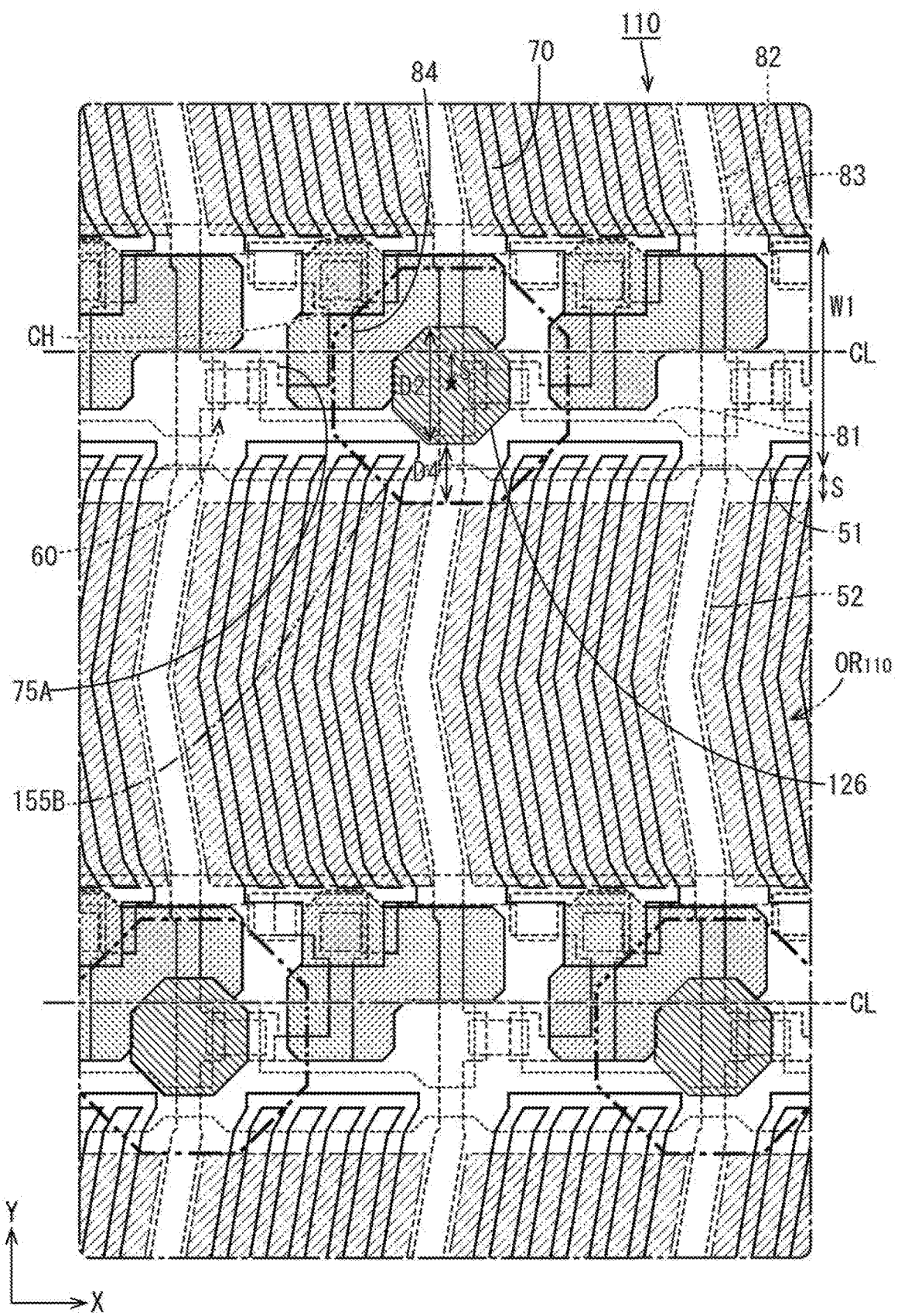
FIG. 8 is a general schematic view illustrating a planar configuration and an aperture region in the display area of an array substrate on which the main spacers and the sub spacers are disposed such that the sub spacers are shifted similar to the main spacers.

Comparative Experiment 1 was performed to know influence on the aperture area of each sub pixel by providing the main spacers 25 and the sub spacers 26 as described above. In Comparative Experiment 1, Example 1 and Comparative Example 1 were performed. The liquid crystal panel 10 according to the first embodiment (refer FIG. 3) is used in Example 1, and a liquid crystal panel 110 illustrated in FIG. 8 is used in Comparative Example 1. In the liquid crystal panel 210, a sub spacer 126 is disposed in a different position from the sub spacer 26 and an arrangement area of the light blocking layer extending in the X-axis direction is increased to appropriately block light in a vicinity of the sub spacer 126.

In Example 1 and Comparative Example 1, with reference to FIG. 4, the width W1 of the TFT light blocking section 51 is 40 μm, the width D1 of the main spacer 25 base is about 13 μm, the width D2 of the sub spacer 26 base is about 20 μm, the light blocking width D3 around the main spacer 25 is 21 μm, the light blocking width D4 around the sub spacer 26 is 10 μm, and the shift amount S of the center of the main spacer 25 from the center line CL of the TFT light blocking section 51 is 6.5 μm. The distribution density and the arrangement ratio of the main spacers 25 are same as those of the sub spacers 26.

In Example 1, the sub spacer 26 is disposed such that the center thereof is positioned on the center line CL of the TFT light blocking section 51. In Comparative Example 1, the sub spacer 126 is disposed such that the center thereof is shifted from the center line CL of the TFT light blocking section 51 by the shift amount S, which is 6.5 μm, similarly to the main spacer 25. The sub spacer light blocking section 155B of Comparative Example 1 is provided according to the position of the sub spacer 126.

In FIG. 3, an open area OR of the liquid crystal panel 10 is illustrated with shading different from that of the hole 75A. The sub spacer 126 of the liquid crystal panel 110 and an outline $OL_{110}$ of the open area $OR_{110}$ of the liquid crystal panel 110 are illustrated with bold two dotted dashed lines. In FIG. 8, the open area $OR_{110}$ of the liquid crystal panel 110 is illustrated with shading.

Table 1 illustrates calculation results of the aperture area and the area ratio of the sub pixel including the sub spacer 26 in the liquid crystal panel 10 of Example 1 and those of the sub pixel including the sub spacer 126 in the liquid crystal panel 110 of Comparative Example 1.

TABLE 1

|  | APERTURE AREA ($\mu m^2$) | AREA RATIO (%) |
|---|---|---|
| EXAMPLE 1 | 3215.9 | 100.0 |
| COMPARATIVE EXAMPLE 1 | 3046.9 | 94.7 |

In Example 1, the sub spacer 26 is disposed such that the center thereof is positioned on the center line CL of the TFT light blocking section 51 and only the main spacer 25 is disposed such that the center thereof is shifted lower from the center line CL by the certain shift amount S, which is 6.5 µm. According to such a configuration, the main spacer 25 is disposed such that the center of projecting end thereof is in contact with a flat reference surface of the array substrate 30 that is off from the hole 75A. Therefore, the uniform cell gap G can be maintained stably. According to the shift position of the main spacer 25, the position of the main spacer light blocking section 55A is also required to be shifted. Since the light blocking width D3 of the main spacer light blocking section 55A is originally large, the light blocking width $D_{CH}$ required for blocking light at the contact hole CH and the light blocking width $D_{TFT}$ required for blocking light at the TFT 60 can be maintained even if the main spacer light blocking section 55A is shifted. Light blocking is achieved by only shifting the position of the main spacer light blocking section 55A without decreasing largely the aperture area (decreasing the aperture ratio) of the sub pixel of the liquid crystal panel.

In Comparative Example 1, similar to the main spacer 25, the sub spacer 126 is disposed such that the center thereof is positioned lower from the center line CL of the TFT light blocking section 51 by the certain shift amount S, which is 6.5 µm. According to the position shift of the sub spacer 126, the position of the sub spacer light blocking section 155B is also required to be shifted. A part of the sub spacer light blocking section 155B projects from the TFT light blocking section 51 to keep the light blocking width $D_{CH}$ required for blocking light at the contact hole CH and the light blocking width $D_{TFT}$ required for blocking light at the TFT 60. The width D2 is set to satisfy the formula of D4=(W1−D2)/2. Therefore, the sub spacer light blocking section 155B projects from the TFT light blocking section 51 by the amount of the certain shift amount S, which is 6.5 µm. The number of sub spacers 126 is large. Therefore, if the width of the light blocking layer extending in the X-axis direction is increased to (W1+S) to include the whole sub spacer light blocking section 155B as illustrated in FIG. 8, the aperture area of the sub pixel is greatly decreased. Specifically, as is clear from Table 1, the aperture area is decreased by about 5.3% with comparing Example 1 and Comparative Example 1.

As described before, the liquid crystal panel 10 according to the first embodiment includes the array substrate 30 and the CF substrate (the counter substrate) 20 opposite the array substrate 30 and has the liquid crystal layer 40 therebetween. The array substrate 30 includes the sub-pixel electrodes 70 that are arranged in a matrix. The CF substrate 20 includes the sub-pixel in-between light blocking section 50, the main spacer (the first projection) 25, and the sub spacers (the second projections) 26. The sub-pixel in-between light blocking section 50 is configured to restrict transmission of light and extends in a grid to surround the sub-pixel electrodes 70 in a plan view seen in a normal direction of the CF substrate 20. The main spacer 25 projects from the CF substrate 20 toward the array substrate 30 and has a projecting end that is contacted with a part of the array substrate 30 to define a distance (the cell gap G) between the CF substrate 20 and the array substrate 30. The sub spacers 26 project from the CF substrate 20 toward the array substrate 30 such that projecting ends thereof are spaced from the array substrate 30. The main spacer 25 and the sub spacers 26 overlap the sub-pixel in-between light blocking section 50 in the plan view. The main spacer 25 and the sub spacers 26 are arranged such that a distance between the centerline CL of the width of the sub-pixel in-between light blocking section 50 and a center of the sub spacer 26 is smaller than a distance between the center line CL of the width of the sub-pixel in-between light blocking section 50 and a center of the main spacer 25.

According to the above configuration, the main spacer 25 defines the distance between the array substrate 30 and the CF substrate 20 and the sub spacers 26 protect the substrate internal structure from the external pressure force applied to the plate surfaces of the substrates 20, 30. The spacers 25, 26 may disturb the alignment of the liquid crystal molecules. However, the spacers 25, 26 overlap the sub-pixel in-between light blocking section 50 that is disposed around each of the sub pixel electrodes 70. According to such a configuration, a part or a whole of the spacer light blocking section 55 that blocks light at the spacers is included in the sub-pixel in-between light blocking section 50. Therefore, the spacers are disposed at a certain density while keeping the display quality without increasing the arrangement area of the light blocking layer within the surface area of the liquid crystal panel 10. The sub-pixel in-between light blocking section 50 that is arranged in a grid to surround each of the sub-pixel electrodes 70 clearly defines light rays whose transmission is switched between on and off according to driving of each sub-pixel electrode 70 and improves contrast of a displayed image. In the first embodiment, the CF substrate 20 includes the color portions 23 that are arranged in a matrix to opposed to the respective sub-pixel electrodes 70 and configured to selectively transmit light of a specific color. The sub-pixel in-between light blocking section 50 is disposed on the border between the color portions 23 and prevents the colors from mixing and improves color contrast of a displayed image.

The sub spacer 26 has the light blocking width D4 that is required for light blocking and is relatively small and is disposed such that the center thereof is close to the center line CL of the sub-pixel in-between light blocking section 50. Therefore, most part or a whole of the sub spacer light blocking section 55B is included in the sub-pixel in-between light blocking section 50. The arrangement area of the light blocking layer extending in the X-axis direction and including the sub-pixel in-between light blocking section 50 and the spacer light blocking section 55 is reduced. The sub spacers 26 are not configured to define the cell gap G.

Therefore, no problem occurs even if the array substrate 30 has an uneven structure (a hole structure) in sections corresponding to the sub spacers 26.

The main spacer 25 that defines the cell gap G has a large light blocking width D3 required for light blocking. Therefore, even if the main spacer 25 is disposed such that the center thereof is close to the center line CL of the sub-pixel in-between light blocking section 50, for example, on the center line CL, at least a part of the main spacer light blocking section 55A projects from the sub-pixel in-between light blocking section 50. Shifting of such a main spacer 25 only results in that a different part of the main spacer light, blocking section 55A projects from the sub-pixel in-between light blocking section 50 and a projecting area is not largely changed. Further, the number of the main spacers 25 is relatively small and therefore, the arrangement area of the light blocking layer extending in the X-axis direction and including the sub-pixel in-between light blocking section 50 and the spacer light blocking section 55 is not required to be largely increased. By shifting the position of the main spacer 25, the main spacer 25 is disposed such that the center of the projecting end thereof is contacted with the flat reference surface of the array substrate 30 that is off from the hole 75A (an example of the uneven structure). Accordingly, the uniform cell gap G can be stably maintained.

As described above, the position of the main spacer 25 with respect to the center line CL of the width of the sub-pixel in-between light blocking section 50 is shifted from that of the sub spacer 26. Specifically, the distance between the center line CL of the sub-pixel in-between light blocking section 50 and the center of the sub spacer 26 (zero in the first embodiment) is smaller than the distance between the center line CL of the sub-pixel in-between light blocking section 50 and the center of the main spacer 25 (the shift amount S in the first embodiment). According to such a configuration, the cell thickness unevenness is less likely to be caused in a plane surface of the liquid crystal panel 10 and the liquid crystal panel 10 has a good pressure force resistance property. In such a liquid crystal panel 10, a high aperture ratio is maintained and light is appropriately blocked in a part of the liquid crystal molecules whose alignment is to be disturbed.

The sub spacer 26 may be disposed such that the center thereof is on the center line CL of the sub-pixel in-between light blocking section 50.

According to such a configuration, if the sub spacer 26 is arranged symmetrically with respect to a straight line parallel to the center line CL of the sub-pixel in-between light blocking section 50 and passing through the center of the arrangement area of the sub spacer 26, the arrangement area of the sub spacer 26 is greatest within an area such that the sub spacer light blocking section 55B does not project from the sub-pixel in-between light blocking section 50. Accordingly, the pressure force resistance property is improved without decreasing the aperture ratio.

The array substrate 30 may include the TFTs 60 (switching components) that are arranged in a matrix, and the gate lines 81 (scanning lines) through which scanning signals are transmitted to the TFT 60. The sub-pixel in-between light blocking section 50 includes the TFT light blocking section 51 (the switching component light blocking section) that extends along the gate lines 81 and overlaps the TFTs 60. The distance between the center line CL of the width of the sub-pixel in-between light blocking section 50 and the center of the sub spacer 26 is smaller than the distance between the center line CL of the width of the sub-pixel in-between light blocking section 50 and the center of the main spacer 25.

The center of the sub spacer 26 may be positioned on the center line CL of the width of the TFT light blocking section 51.

The TFTs 60 may cause alignment disturbance of the liquid crystal molecules similarly to the main spacer 25 and the sub spacer 26. According to the above structure, the sub-pixel in-between light blocking section 50 of the CF substrate 20 overlaps the TFTs 60. The main spacers 25 that keep a uniform cell gap G and the sub spacers 26 are disposed in an area within the TFT light blocking section 51 that is disposed for improving color contrast of the displayed image and blocking light at the line section. Accordingly, high display quality is stably achieved while restricting increase of the arrangement area of the light blocking layer and maintaining a high aperture ratio of each sub pixel.

Further, if the sub spacer 26 is arranged symmetrically with respect to the straight line parallel to the center line CL of the TFT light blocking section 51 and passing through the center of the arrangement area of the sub spacer 26, the arrangement area of the sub spacer 26 is greatest within an area such that the sub spacer light blocking section 55B does not project from the TFT light blocking section 51. Accordingly, the pressure force resistance property is improved without decreasing the aperture ratio.

The array substrate 30 may further include the source lines 82 (the signal lines), the drain lines 84 (the sub-pixel electrode connecting lines), and the common electrode 75. Image signals are transmitted to the sub-pixel electrodes 70 through the source lines 82. The drain line 84 is arranged spaced from the source line 82 and connected to the sub-pixel electrode 70. The common electrode 75 is included in a different layer from the sub-pixel electrodes 70, the source lines 82, and the drain lines 84 and overlaps at least the sub-pixel electrodes 70. The common electrode 75 has holes 75A. The holes 75A are formed in sections that overlap the TFT light blocking section 51 and do not overlap the main spacer 25.

The hole 75A may at least extend between the source line 82 and the drain line connecting section (a connecting section) of the sub-pixel electrode 70.

In the array substrate 30, the common electrode 75 has the hole 75A in the section thereof overlapping the TFT light blocking section 51. Therefore, if short circuit is caused between the source line 82 and the gate line 81 or the section corresponding to the TFT 60 is brightened, such errors can be repaired easily without causing short circuit between the common electrode 75 and other lines. Specifically, the source line 82 is irradiated with laser light through the hole 75A to be cut and is connected to the auxiliary line such that image signals can be supplied to the TFT 60 connected to the source line 82 through the auxiliary line. As described before, the hole 75A extends at least between the source line 82 and the drain line connecting section (the connecting section) of the sub-pixel electrode 70. Therefore, in repairing the above errors, short circuit is less likely to be caused between the section of the source line 82 irradiated with laser light and the common electrode 75 and the display quality is maintained. According to the above configuration, in the liquid crystal panel 10 including the hole 75A for the line repair, the main spacer 25 is disposed such that the center of the projecting end is contacted with the portion that is off from the hole 75A. Accordingly, adverse effects is less likely to be caused by the uneven structure of the common electrode pattern on the array substrate 30 and a uniform cell gap G is stably maintained.

Second Embodiment

A second embodiment of the present technology will be described with reference to FIGS. 9 to 12.

In the second embodiment, a liquid crystal panel 210 includes an array substrate 230 and a CF substrate 220. The array substrate 230 includes base seats 291, 292 opposite main spacers 225 and sub spacers 226 of the CF substrate 220, respectively. Hereinafter, components same as those of the first embodiment are provided with same numbers or symbols and will not be described.

Figure 9:
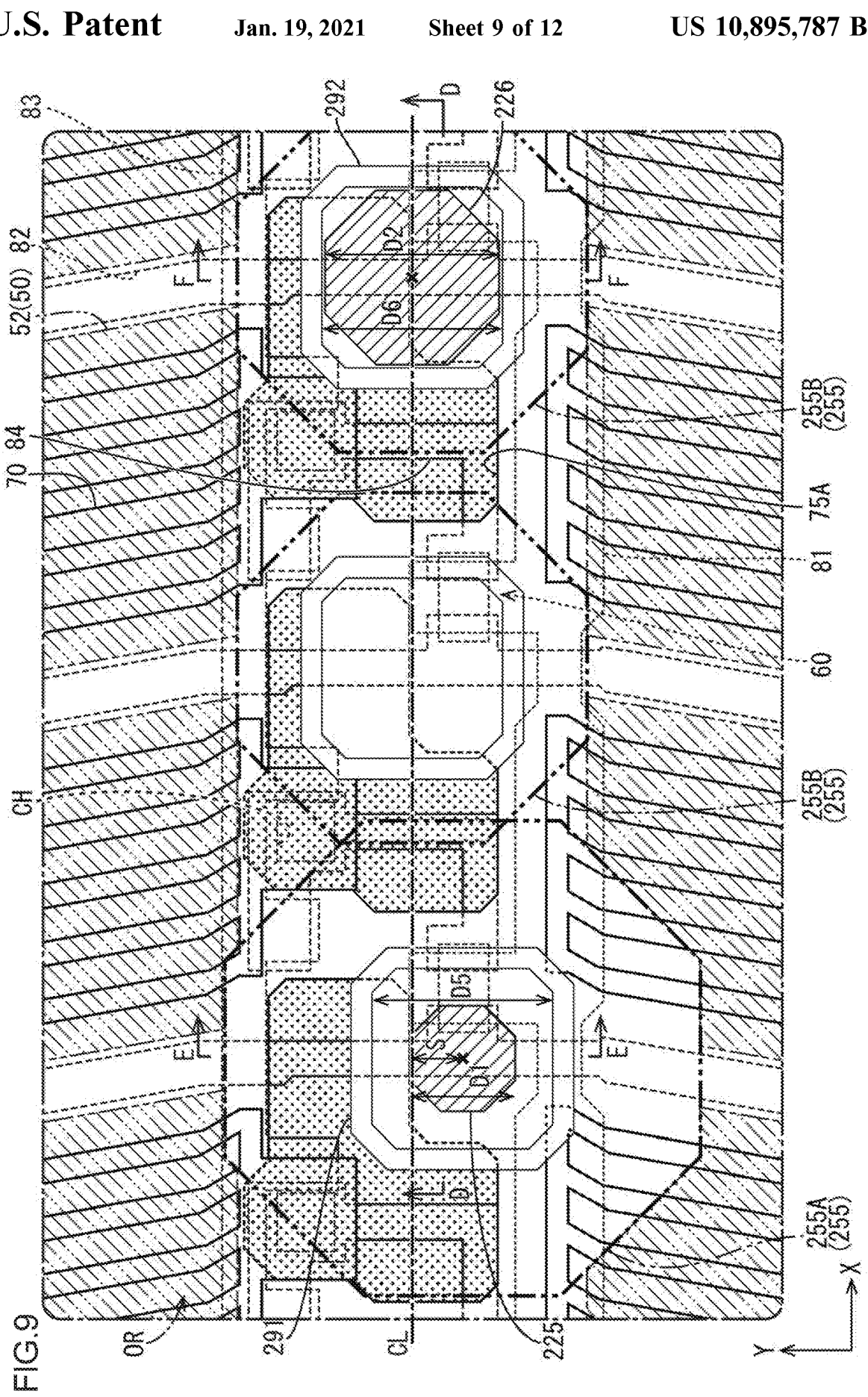
FIG. 9 is an enlarged plan view illustrating a part of the configuration of the array substrate near a TFT light blocking section according to a second embodiment and the array substrate having the main spacer.
Figure 10:
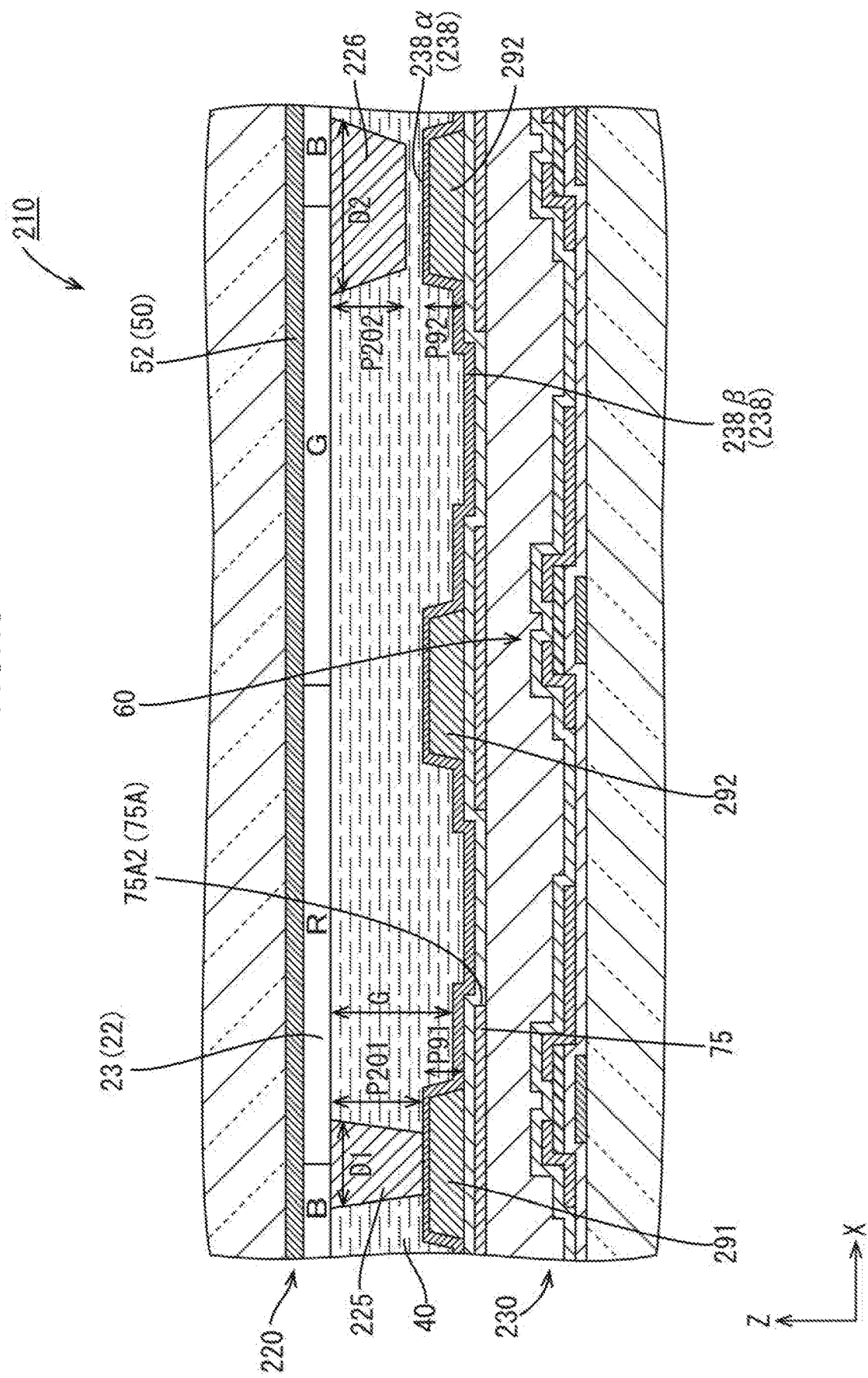
FIG. 10 is a cross-sectional view taken along line D-D in FIG. 9.

As illustrated in FIG. 9, the CF substrate 220 according to the second embodiment includes the main spacer 225 and the sub spacer 226 corresponding to the main spacer 25 and the sub spacer 26 of the CF substrate 20 of the first embodiment, respectively. Namely, the sub spacer 226 is disposed such that the center thereof is on the center line CL of the TFT light blocking section 51 and the main spacer 225 is disposed such that the center thereof is lower than the center line CL by the certain shift amount S in FIG. 9. In the second embodiment, as will be described later, the array substrate 230 includes a contact base seat 291 that is opposite the main spacer 225 and covers a part of the hole 75A. The contact base seat 291 may have an uneven top surface thereof because the uneven structure is formed on the common electrode 75. Therefore, the main spacer 225 is shifted from the center line CL. As illustrated in FIG. 10, in the second embodiment, the main spacer 225 and the sub spacer 226 have a columnar shape tapered toward the array substrate 230 and having a substantially regular octagonal cross-sectional shape similarly to the main spacer 25 and the sub spacer 26 of the first embodiment. The main spacer 225 has a projecting dimension P201 that is smaller than the projecting dimension P1 of the main spacer of the first embodiment and the sub spacer 226 has a projecting dimension 202 that is smaller than the projecting dimension P2 of the sub spacer 26. The projecting dimension P201 is smaller than the cell gap G. In the second embodiment, the projecting dimension of the main spacer 125 is 2.0 μm and the projecting dimension of the sub spacer 126 is 1.4 μm.

As illustrated in FIG. 9, the array substrate 230 of the second embodiment includes the gate lines 81, the source lines 82, the capacitor lines 83, the drain lines 84, the TFTs 60, the contact holes CH, and further the base seats 291, 292 each of which overlaps (covers) a part of the hole 75A formed in the common electrode 27. The liquid crystal panel 210 includes the base seats 291, 292 that are opposite the main spacer 225 and the sub spacer 226 of the CF substrate 220, respectively. One of the base seats that is opposite the main spacer 225 and contacted with a projecting end of the main spacer 225 is the contact base seat 291 and another one of the base seats that is opposite the sub spacer 226 is an opposite base seat 292. According to the positions of the spacers 225, 226, the opposite base seat 292 is disposed such that the center thereof is on the center line CL of the TFT light blocking section 51 and the contact base seat 291 is disposed such that the center thereof is shifted lower than the center line CL by the shift amount S in FIG. 9.

A cross-sectional shape and a ratio of a vertical dimension and a lateral dimension of an arrangement area of the base seats 291, 292 are not limited but the contact base seat 291 preferably has a top surface larger than a surface of the projecting end of the main spacer 225. According to such a configuration, the projecting end of the main spacer 225 is directly contacted with the top surface of the contact base seat 291 stably to keep the cell gap G of the liquid crystal panel 210. As the area of the top surface of the contact base seat 291 is increased, the acceptable shift range of the substrates 230, 220 can be greater in bonding the array substrate 230 and the CF substrate 220. In a process of producing the liquid crystal panel 210, generally, the alignment film forming resin is disposed on the array substrate 230 after the base seats 291, 292 are formed. In such a process, a flowing path of the alignment film forming resin flowing in the Y-axis direction is provided only between the base seats 291, 292 that are adjacent to each other in the X-axis direction. Therefore, the width between the base seats 291, 292 arranged in the X-axis direction is preferably small to improve a coating property of the alignment film. The base seats 291, 292 may disturb alignment of the liquid crystal molecules similarly to the spacers 225, 226. Therefore, it is preferable to dispose the light blocking layer around the base seats 291, 292. Since the base seats 291, 292 are arranged to be opposite the respective spacers 225, 226, light is blocked in the sections around the base seats 291, 292 by the main spacer light blocking section 255A and the sub spacer light blocking section 255B.

The vertical dimension and the lateral dimension of the arrangement area of each of the base seats 291, 292 is preferably determined while achieving the function as the receiving base that is to be contacted with the main spacer 225 and providing the flowing path of the alignment film forming resin and the light blocking section.

In the second embodiment, as illustrated in FIG. 9, the base seats 291, 292 have a square cross-sectional shape with four round corners and are tapered toward the CF substrate 220. As illustrated in FIG. 9, the width D6 of the top surface of the opposite base seat 292 in each of the X and Y directions is slightly greater than the width D2 of the base section of the sub spacer 226 in each of the X and Y directions. The width D5 of the top surface of the contact base seat 291 is much greater than, for example, about twice of the width D1 of the base section of the main spacer 225 in each of the X and Y directions. The contact base seat 291 and the opposite base seat 292 may project by the same amount in view of simplifying the manufacturing.

As illustrated in FIG. 9, the base seats 291, 292 are basically provided for all of the main spacers 225 and the sub spacers 226. If there is a sub pixel having no spacer, it is preferable to provide the base seat for such a sub pixel. If the liquid crystal panel 210 includes sub pixels including the base seats and sub pixels not including the base seats, the coating of the alignment film forming resin that is to be disposed after the forming of the base seats may be varied according to the presence of the base seat, and the alignment film may be uneven and display unevenness may be caused. In the second embodiment, similar to the first embodiment, one main spacer 225 or one sub spacer 226 is arranged for every two sub pixels. Therefore, the opposite base seat 292 is provided for the sub pixel disposed in the middle in FIG. 9 having no corresponding spacer.

Figure 11:
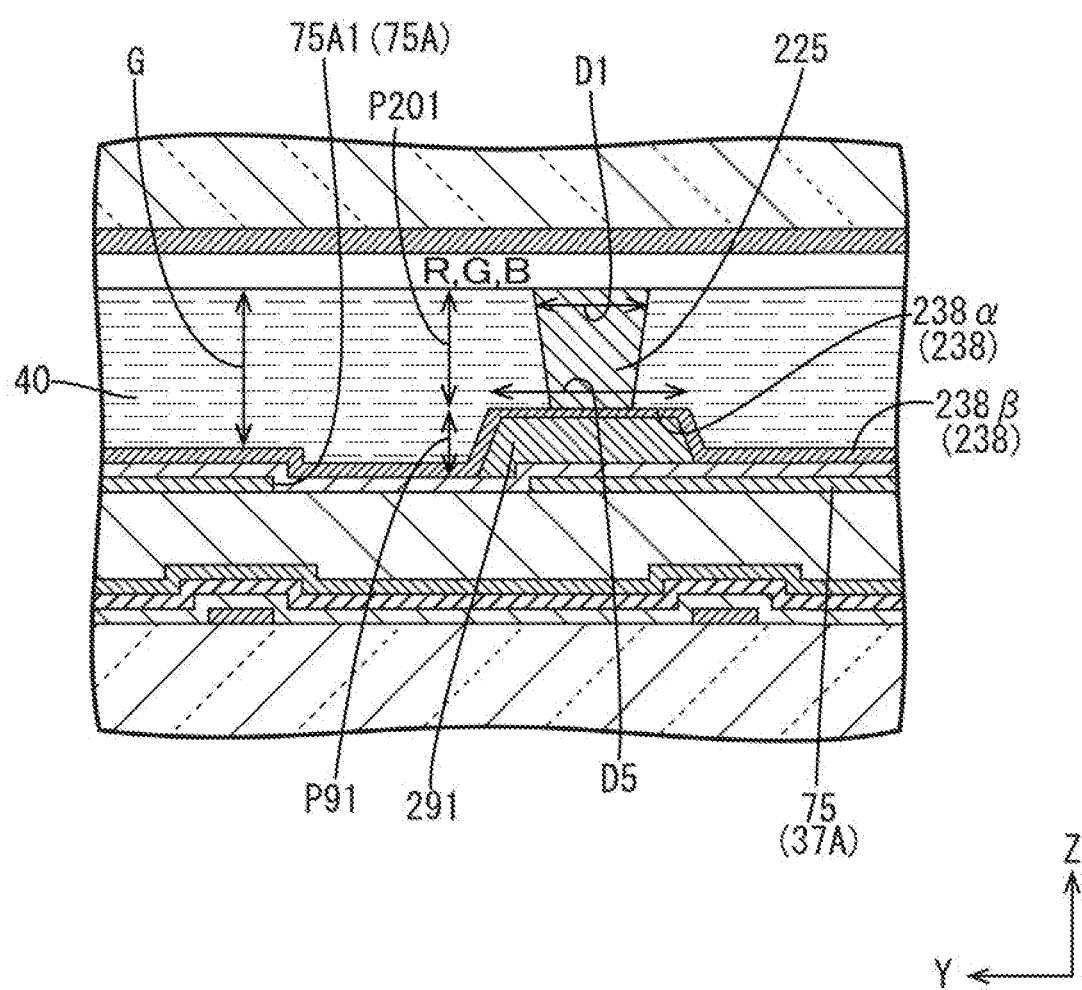
FIG. 11 is a cross-sectional view taken along line E-E in FIG. 9.
Figure 12:
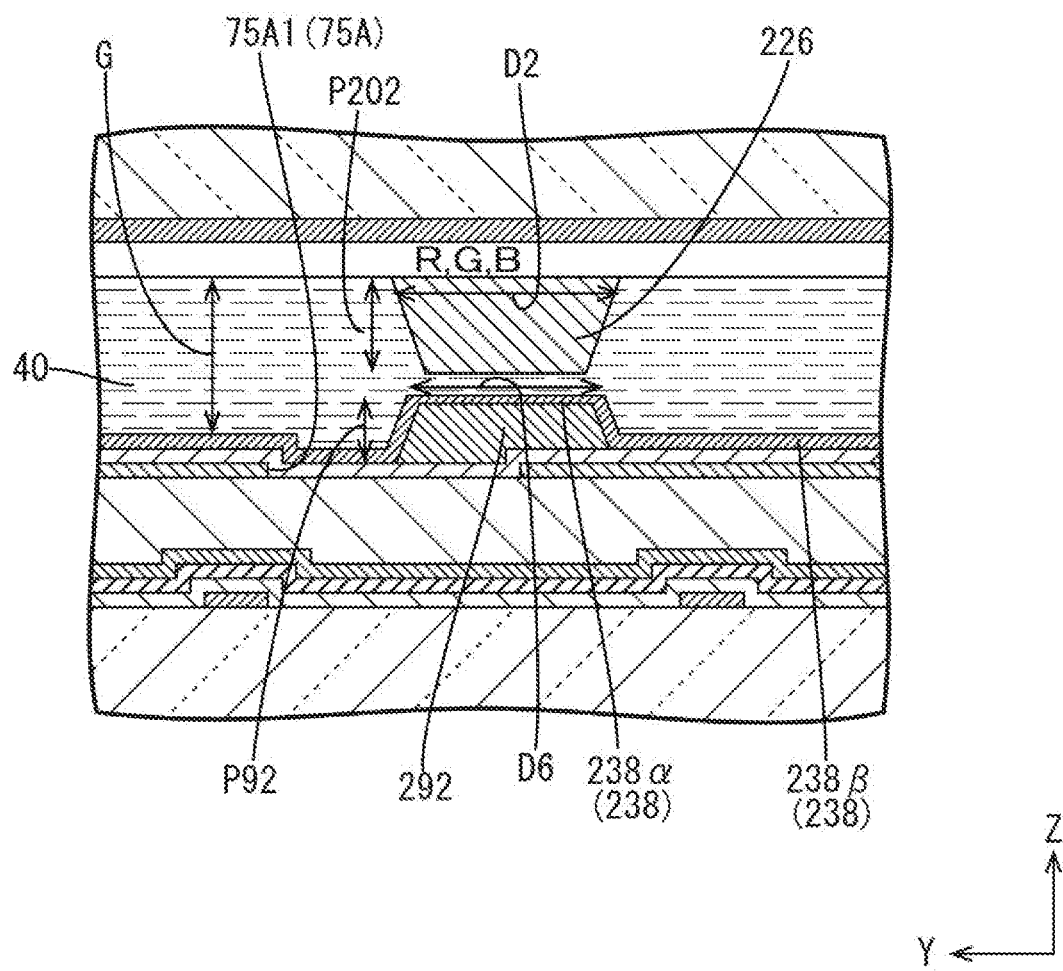
FIG. 12 is a cross-sectional view taken along line F-F in FIG. 9.

As illustrated in FIGS. 10 and 11, the projecting end of the main spacer 225 is contacted with the top surface of the contact base seat 291 to keep the cell gap G of the liquid crystal panel 210. Therefore, the projecting dimension P91 of the contact base seat 291 is set such that a total of the projecting dimension P91 and the projecting dimension P201 of the main spacer 225 is substantially equal to the cell gap G. The contact base seat 291 and the main spacer 225 are compressed by a compression amount a when the array substrate 230 and the CF substrate 220 are bonded to each other. Therefore, in forming the contact base seat 291 and the main spacer 225, the projecting dimensions thereof may be determined with considering the compression amount α. In FIGS. 9 to 11, the alignment film 238 is illustrated with a relatively great thickness for simple explanation. A ratio of the projecting dimension P201 of the main spacer 225 and the projecting dimension P91 is not particularly limited and may be determined appropriately. The projecting dimension P202 of the sub spacer 226 is smaller than the projecting dimension P201 of the main spacer 225 and a total of the projecting dimension P202 and the projecting dimension P92 of the opposite base seat 292 is smaller than the cell gap G. Accordingly, the projecting end of the sub spacer 226 and the top surface of the opposite base seat 292 are opposite each other having a clearance therebetween. In the second embodiment, as illustrated in FIG. 10, the projecting dimension P91 of the contact base seat 291 is substantially equal to the projecting dimension P92 of the opposite base seat 292. The projecting dimension P201, P202 of the spacer 225, 226 is set to approximately same or twice as the dimension P91, P92. Specifically, the projecting dimensions P91, P92 of the contact base seat 219 and the opposite base seat 29 are 1.2 μm. As described before, the projecting dimension of the main spacer 125 is 2.0 μm and the projecting dimension of the sub spacer 126 is 1.4 μm. By the application of load to the array substrate 30 and the CF substrate 20 that are bonded to each other, the main spacer 125 and the contact base seat 291 are compressed by about 0.2 μm and the cell gap G is 3.0 μm.

In the second embodiment, the alignment film 238 that is disposed on the most inner surface side (opposite the liquid crystal layer 40) of the array substrate 230 has sections of an alignment film 238α on the top surfaces of the contact base seats 291 and the opposite base seats 292. The alignment film 238α is thinner than an alignment film 238β that is disposed on other sections. In a process of producing the liquid crystal panel 210, generally, the alignment film forming resin is disposed on an inner surface of the array substrate 230 after the base seats 291, 292 are formed. In such a process, the alignment film forming resin is less likely to flow to the top surfaces of the base seats 291, 292 projecting from other surface of the array substrate 230. Therefore, the alignment film 238 is easily formed on the top surfaces of the base seats 291, 292 with a quite small thickness.

As described before, the liquid crystal panel 210 of the second embodiment may include following configurations.

The array substrate 230 may include the contact base seat 291 projecting from the array substrate 230 toward the CF substrate 220 opposite the main spacer 225 and the contact base seat 291 is configured to be contacted with the main spacer 225.

According to such a configuration, the projecting end of the main spacer 225 is contacted with the top surface of the contact base seat 291 to define the cell gap G. Since the array substrate 230 includes the contact base seat 291, adverse effects are less likely to be caused by the uneven structure formed on the inner surface of the array substrate 230. A uniform cell gap G is maintained easily and a structure formed on the inner surface of the array substrate 230 is less likely to be damaged. The contact base seat 291 also causes disturbance of the alignment of the liquid crystal molecules. Therefore, the light blocking layer is preferably included in the section having the contact base seat 291. The contact base seat 291 is arranged opposite the main spacer 225 and the light is blocked by the main spacer light blocking section 255A in the surrounding section of the contact base seat 291. Therefore, the aperture ratio of the liquid crystal panel 210 is maintained high without increasing the arrangement area of the light blocking layer.

In producing the array substrate 230 having the alignment film 238 on the surface thereof that is to be contacted with the liquid crystal layer 40, the alignment film forming resin is disposed after forming the contact base seat 291 such that a quite thin alignment film 238 is formed on the top surface of the contact base seat 291 compared to the thickness of the alignment film 239 formed on other section having no base seat. Accordingly, the above configuration is easily achieved and the advantageous effects can be obtained.

In the liquid crystal panel 210, the array substrate 230 may include the alignment film 238 on a surface opposite and closest to the CF substrate 220. The alignment film 238 is configured to align the liquid crystal molecules in a certain direction. The alignment film 23S is thinner on the top surface of the contact base seat 291 than other sections.

In the liquid crystal panel 210, the main spacer 225 of the CF substrate 220 that defines the cell gap G is contacted with the alignment film 238 of the array substrate 230. In such a liquid crystal panel 210, the alignment film 238 is removed by a frictional force created between the main spacer 225 and the alignment film 238 by the application of an external force of pressing the display surface of the liquid crystal panel 210. Accordingly, a removed piece of the alignment film 238 may travel within the liquid crystal layer 40 and cause small bright points that may cause display errors. Such errors may be referred to as scattered bright points. According to the above configuration, the main spacer 225 is contacted with only the top surface of the contact base seat 291 and the alignment film 238 on the top surface is thinner than that on the other sections. Therefore, the piece of the alignment film 238 that may be removed by the external force is quite small and errors of the scattered bright points are greatly reduced.

In the liquid crystal panel 210, the top surface of the contact base seat 291 has an area greater than that of the projecting end of the main spacer 225.

According to the above configuration, the uniform cell gap G can be maintained while allowing a small displacement that may be caused in bonding the array substrate 230 and the CF substrate 220.

In the liquid crystal panel 210, the array substrate 230 includes the opposite base seat 292 that projects from the array substrate 230 toward the sub spacer 226 and is disposed opposite the sub spacer 226 while keeping a clearance between the top surface of the opposite base seat 292 and the projecting end of the sub spacer 226. The array substrate 230 includes the alignment film 238 on the surface thereof closest to the CF substrate 220 and the liquid crystal molecules are aligned in a certain direction through the alignment film 238. The alignment film 238 is thinner on the top surface of the opposite base seat 292 than other sections.

According to the above configuration, if an external force is applied to the liquid crystal panel 210, the projecting end of the sub spacer 226 is contacted with the top surface of the opposite base seat 292 such that the substrate internal structures of the array substrate 230 and the CF substrate 220 that are formed on the opposite surface sides thereof (on the liquid crystal layer 40 side) are surely protected. In the configuration including the alignment film 236, the alignment film 238α formed on the top surface of the opposite base seat 292 is thinner than the alignment film 238β formed on other sections such that the scattered bright points are less likely to be caused.

Other Embodiments

The technology described herein is not limited to the embodiments described in the above sections and the drawings. For example, the following embodiments may be included in a technical scope.

(1) The projecting dimension of the sub spacer may be equal to or greater than the projecting dimension of the main spacer. In such a configuration, the base seat is disposed only opposite the main spacer and such that the projecting end of the main spacer is contacted with a part of the array substrate, and the projecting end or the sub spacer is disposed to keep a clearance from the array substrate. Accordingly, the advantageous effects of the present technology can be obtained.

(2) Each of the main spacer and the sub spacer may have a X-axis width and a Y-axis width that are different from each other or may have a circular columnar shape or an elliptical columnar shape. If a spacer has an elliptical columnar shape with a long axis in the Y-axis direction, the alignment film forming resin is easily disposed in a uniform manner. Each of the spacers may have a same cross-sectional shape from a basal end to a projecting end thereof. The main spacers and the sub spacers do not necessarily have a similar shape but may have different shapes.

(3) The sub-pixel in-between light blocking section does not necessarily include belt-shaped light blocking sections that are perpendicular to each other (the source line light blocking section and the TFT light blocking section) and formed in a grid. The sub-pixel in-between light blocking section may include belt-shaped light blocking sections that cross at a certain angle such as 120 degrees.

(4) The array substrate that includes switching components other than TFTs (e.g., thin film diodes (TFDs)) may be included in the scope of the present technology. Furthermore, array substrates used in black-and-white liquid crystal display panels are also included in the scope of the present technology.

(5) The above embodiment includes the array substrate used in a liquid crystal panel of a lateral electric field type that includes a fringe filed switching (FFS) mode in which an electric field is applied to the liquid crystal molecules in a direction parallel to a substrate surface (a lateral direction) as an operation mode. Therefore, a pair of electrodes (the sub-pixel electrode 70 and the common electrode 75) is formed on the array substrate. However, the present technology is not limited to such a configuration. An array substrate used in a display panel that includes an in-plane switching (IPS) mode, a vertical alignment (VA) mode, and a twisted nematic (TN) mode is also included in the scope of the present technology. Further, a liquid crystal panel having a touch sensor function is also included in the scope of the present technology.

The invention claimed is:

1. A liquid crystal panel comprising:
an array substrate including
sub-pixel electrodes that are arranged in a matrix,
switching components that are arranged in a matrix,
scanning lines that extend in a first direction to supply scanning signals to the switching components, and
signal lines that extend in a second direction to supply image signals to the sub-pixel electrodes;
a counter substrate disposed opposite the array substrate, the counter substrate including
a sub-pixel in-between light blocking section configured to block light and being disposed to surround the sub pixel electrodes in a plan view in a normal direction of the counter substrate,
a first projection projecting from the counter substrate toward the array substrate and including a projecting end that contacts a section of the array substrate to define a distance between the counter substrate and the array substrate, the first projection overlapping the sub-pixel in-between light blocking section, and
second projections projecting from the counter substrate toward the array substrate and including projecting ends that are spaced from the array substrate, the second projections overlapping the sub-pixel in-between light blocking section; and
a liquid crystal layer disposed between the array substrate and the counter substrate, wherein
the sub-pixel in-between light blocking section includes switching component light blocking sections that extend in the first direction to overlap the scanning lines and signal line light blocking sections that extend in the second direction to overlap the signal lines,
the first projection and each of the second projections are disposed such that a distance in the second direction between a center line of a corresponding one of the switching component light blocking sections extending in the first direction and a center of the each of the second projections is smaller than a distance in the second direction between the center line of the corresponding one of the switching component light blocking sections and a center of the first projection, and
the first projection and the second projections are disposed at intersections between the corresponding one of the switching component light blocking sections and the signal line light blocking sections, respectively.

2. The liquid crystal panel according to claim 1, wherein the center of the each of the second projections is on the center line of the corresponding one of the switching component light blocking sections.

3. The liquid crystal panel according to claim 1, wherein the signal lines are disposed in a layer different from a layer in which the sub-pixel electrodes are disposed,
the array substrate further includes
sub-pixel electrode connecting lines disposed in the layer in which the signal lines are disposed, and
a common electrode disposed in a layer different from the layer in which the sub-pixel electrodes are disposed and the layer in which the signal lines and the sub-pixel electrode connecting lines are disposed to overlap at least the sub-pixel electrodes,
the sub-pixel electrode connecting lines are spaced from the signal lines and connected to the sub-pixel electrodes, and
the common electrode includes holes that overlap the switching component light blocking sections and do not overlap the first projections.

4. The liquid crystal panel according to claim 3, wherein the sub-pixel electrodes include connecting sections connected to the signal lines, and
each of the holes includes at least a section over a section of the array substrate including a section of a corresponding one of the signal lines and a corresponding one of the connecting sections.

5. The liquid crystal panel according to claim 1, wherein the array substrate further includes a contact base seat opposite the first projection, and the contact base seat projects from the array substrate toward the counter substrate to contact the first projection.

6. The liquid crystal panel according to claim 5, wherein
the array substrate further includes an alignment film through which liquid crystal molecules are aligned in a certain direction,
the alignment film is disposed on a surface of the array substrate opposite the counter substrate, and
the alignment film includes a section disposed on a top surface of the contact base seat having a thickness less than a thickness of other sections of the alignment film.

7. The liquid crystal panel according to claim 5, wherein a top surface of the contact base seat includes an area larger than an area of the projecting end of the first projection.

8. The liquid crystal panel according to claim 1, wherein
the array substrate further includes opposite base seats being opposite the second projections,
the opposite base seats project from the array substrate toward the second projections with a clearance between top surfaces of the opposite base seats and the projecting ends of the second projections,
the array substrate further includes an alignment film through which liquid crystal molecules are aligned in a certain direction,
the alignment film is disposed on a surface of the array substrate opposite the counter substrate,
the alignment film includes sections disposed on top surfaces of the contact base seats, and
the sections of the alignment film have a thickness less than a thickness of other sections of the alignment film.

9. The liquid crystal panel according to claim 1, wherein
the sub-pixel in-between light blocking section further includes switching component light blocking sections and signal line light blocking sections, and
the first projection and the second projections are disposed to overlap the switching component light blocking sections.

10. The liquid crystal panel according to claim 1, wherein
the first projection and the second projections have projecting dimensions that differ from each other.

11. The liquid crystal panel according to claim 1, wherein
the counter substrate further includes color portions arranged in matrix and opposed to the sub-pixel electrodes,
the color portions are configured to pass rays of light in specific colors,
one of the color portions most adjacent to the first projection and one of the color portions most adjacent to the each of the second projections are in the same color.

12. The liquid crystal panel according to claim 11, wherein the corresponding one of the switching component light blocking sections having the center line is disposed between two of the sub-pixel electrodes most adjacent to the second projections.

* * * * *